United States Patent
Cho et al.

(10) Patent No.: US 8,984,389 B2
(45) Date of Patent: Mar. 17, 2015

(54) MOBILE TERMINAL FOR SETTING BOOKMARKING AREA AND CONTROL METHOD THEREOF

(75) Inventors: Jang Muk Cho, Seoul (KR); Jong Hwan Kim, Seoul (KR); Jin Woo Kim, Seoul (KR); Jae Kwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1320 days.

(21) Appl. No.: 12/132,388

(22) Filed: Jun. 3, 2008

(65) Prior Publication Data

US 2008/0313722 A1 Dec. 18, 2008

(30) Foreign Application Priority Data

Jun. 4, 2007 (KR) .................. 10-2007-0054632
Aug. 20, 2007 (KR) .................. 10-2007-0083647
Oct. 24, 2007 (KR) .................. 10-2007-0107220

(51) Int. Cl.
| | | |
|---|---|---|
| G06F 17/00 | (2006.01) |
| G06F 3/0481 | (2013.01) |
| G06F 17/30 | (2006.01) |
| H04L 9/32 | (2006.01) |
| H04L 29/06 | (2006.01) |
| H04M 1/725 | (2006.01) |

(52) U.S. Cl.
CPC ........ *G06F 3/0481* (2013.01); *G06F 17/30884* (2013.01); *H04L 9/3226* (2013.01); *H04L 63/083* (2013.01); *H04M 1/72561* (2013.01); *H04L 2209/80* (2013.01)
USPC ........... 715/206; 715/232; 715/838; 715/854; 715/864

(58) Field of Classification Search
CPC ............ G06F 17/30884; G06F 3/0481; G06F 17/2247
USPC ......... 715/838, 853, 854, 864, 230, 232, 233, 715/241, 206
See application file for complete search history.

(56) References Cited

U.S. PATENT DOCUMENTS

| | | | | |
|---|---|---|---|---|
| 6,313,854 B1 * | 11/2001 | Gibson | ........................ | 715/788 |
| 6,546,393 B1 * | 4/2003 | Khan | ..................... | 1/1 |
| 6,970,867 B1 * | 11/2005 | Hsu et al. | .............................. | 1/1 |
| 6,981,028 B1 * | 12/2005 | Rawat et al. | .................. | 709/217 |
| 7,107,540 B1 * | 9/2006 | Carroll | .......................... | 715/747 |
| 7,225,407 B2 * | 5/2007 | Sommerer et al. | ............. | 715/738 |
| 7,290,204 B1 * | 10/2007 | Kanno et al. | .................. | 715/205 |
| 2003/0135820 A1 * | 7/2003 | Aasman | ........................ | 715/500 |

(Continued)

FOREIGN PATENT DOCUMENTS

| | | |
|---|---|---|
| KR | 10-2000-0037283 A | 7/2000 |
| KR | 2003-0003818 A | 1/2003 |

(Continued)

*Primary Examiner* — Chau Nguyen
*Assistant Examiner* — Howard Cortes
(74) *Attorney, Agent, or Firm* — Birch, Stewart, Kolasch & Birch, LLP

(57) ABSTRACT

A mobile terminal for setting a bookmarked region and its control method are disclosed. According to the method for controlling a mobile terminal, one region of a screen image of an accessed Web page is selected as a select region, and the select region is set as a bookmarked region. When the Web page is re-accessed, the set bookmarked region is displayed as an initial access screen image. Accordingly, when the Web page is re-accessed through bookmarking, the set bookmarked region can be displayed as the initial screen image.

17 Claims, 26 Drawing Sheets

(56) References Cited

U.S. PATENT DOCUMENTS

| | | | |
|---|---|---|---|
| 2003/0177265 A1* | 9/2003 | Page et al. | 709/245 |
| 2004/0019611 A1* | 1/2004 | Pearse et al. | 707/104.1 |
| 2004/0105127 A1* | 6/2004 | Cudd et al. | 358/1.18 |
| 2004/0214611 A1* | 10/2004 | Jong et al. | 455/566 |
| 2004/0236774 A1* | 11/2004 | Baird et al. | 707/100 |
| 2004/0250220 A1* | 12/2004 | Kalenius | 715/864 |
| 2005/0097623 A1* | 5/2005 | Tecot et al. | 725/136 |
| 2005/0131992 A1* | 6/2005 | Goldstein et al. | 709/202 |
| 2005/0210399 A1* | 9/2005 | Filner et al. | 715/767 |
| 2005/0216526 A1* | 9/2005 | Kumagai | 707/201 |
| 2005/0223342 A1* | 10/2005 | Repka et al. | 715/851 |
| 2005/0246622 A1* | 11/2005 | Ahn et al. | 715/500.1 |
| 2005/0246626 A1* | 11/2005 | Lai | 715/513 |
| 2006/0123183 A1* | 6/2006 | Koivisto et al. | 711/1 |
| 2007/0033517 A1* | 2/2007 | O'Shaughnessy et al. | 715/501.1 |
| 2007/0180381 A1* | 8/2007 | Rice et al. | 715/711 |
| 2007/0283267 A1* | 12/2007 | Jeffery et al. | 715/710 |
| 2008/0059906 A1* | 3/2008 | Toki | 715/810 |
| 2008/0104535 A1* | 5/2008 | DeLine et al. | 715/785 |
| 2008/0108341 A1* | 5/2008 | Baard | 455/418 |
| 2008/0235563 A1* | 9/2008 | Nakamura | 715/200 |
| 2008/0270891 A1* | 10/2008 | Friedman et al. | 715/240 |

FOREIGN PATENT DOCUMENTS

| | | |
|---|---|---|
| KR | 10-2004-0083269 A | 10/2004 |
| KR | 10-2004-0091987 A | 11/2004 |
| KR | 10-2007-0033736 A | 3/2007 |

* cited by examiner (A)          (B)          (C)

MOBILE TERMINAL FOR SETTING BOOKMARKING AREA AND CONTROL METHOD THEREOF

CROSS-REFERENCE TO RELATED APPLICATION

This application claims the benefit of Korean Application No. 10-2007-0107220, filed Oct. 24, 2007, No. 10-2007-0054632, filed Jun. 4, 2007 and No. 10-2007-0083647, filed Aug. 20, 2007 in the Korean Intellectual Property Office, the disclosure of which is incorporated herein by reference.

BACKGROUND OF THE INVENTION

1. Field of the Invention

The present invention relates to a mobile terminal capable of setting an initial access screen image in re-accessing a website through bookmarking, and a method of controlling the mobile terminal.

2. Description of the Related Art

A mobile terminal is a portable device equipped with at least one of the function of performing voice call and video call while being portable, the function of inputting and outputting information, the function of storing data, and so on, As the functions of the mobile terminal are diversified, the mobile terminal has been equipped with complicated functions, such as capturing of photos and moving images, play of music files and moving image files, game, reception of broadcasting, and wireless Internet, and has been implemented in the form of a comprehensive multimedia player.

In this mobile terminal implemented as the multimedia player, a variety of attempts have been made to implement complicated functions from a hardware or software viewpoint. For example, the attempts can include a user interface environment for allowing a user to search and/or select functions easily and conveniently. Further, as the mobile terminal has been considered as one of personal belongings for expressing a user's personality, various fashions of design changes are also needed, such as a double-faced liquid crystal display (LCD) or a full touch screen.

In this respect, however, considering the mobility or portability of mobile terminals, the mobile terminals generally include a small display unit employing an LCD (Liquid Crystal Display) or a touch screen, and the size of a screen image that can be reproduced through the small display unit is limited accordingly.

Thus, when a general Web page, not a mobile-dedicated Web page, is accessed via the mobile terminal, a portion of the entire Web page is displayed on a screen and then the screen image is scrolled up/down and left/right to view the entire Web page, because the entire Web page could be hardly discernible if it is displayed on a single screen.

In this case, a left upper portion of the Web page is typically displayed, but if the portion does not have information desired by a user in the Web page, much time and efforts should be taken to search the desired Web page portion,

SUMMARY OF THE INVENTION

Accordingly, one object of the present invention is to provide a mobile terminal capable of displaying a bookmarked region as an initial access screen image when a Web page is re-accessed through bookmarking, and its operation control method.

Another object of the present invention is to provide a mobile terminal capable of allowing a user to easily and simply search a Web page accessed through a limited screen of the mobile terminal, and its control method.

Still another object of the present invention is to provide a mobile terminal capable of effectively displaying at least one set bookmarked information, and its control method.

To achieve the above objects, there is provided a method for controlling a mobile terminal, including: selecting one region of an image of an accessed Web page displayed on a screen; setting the select region as a bookmarked region; and displaying the bookmarked region as an initial access screen image when the Web page is re-accessed. The select region may be selected as a Web page frame region including a touch-inputted portion on the Web page screen.

To achieve the above objects, there is also provided a method for controlling a mobile terminal, including: accessing a Web page by driving a Web browser; selectively setting a certain region of the Web page; and displaying the Web page on a screen based on the set region when the Web page is re-accessed.

To achieve the above objects, there is also provided a method for controlling a mobile terminal, including; designating at least one bookmark points in a certain Web page; and displaying a screen image of the Web page and a thumbnail screen image summarizing the Web page screen image, and displaying the at least one bookmarks on the thumbnail screen image.

To achieve the above objects, there is also provided a mobile terminal including: a display unit that displays a screen image of an accessed Web page; and a controller that sets a region selected from the Web page screen image as a bookmarked region, and controls the display unit to display the bookmarked region as an initial access region when the Web page is re-accessed.

To achieve the above objects, there is also provided a mobile terminal including: a display unit; and a controller that selectively sets a certain region of an accessed Web page and displays the Web page on a screen based on the set region when the Web page is re-accessed.

To achieve the above objects, there is also provided a mobile terminal including: a user input unit that designates at least one bookmark point in a certain Web page; a memory that stores the at least one bookmark point designated via the user input unit; and a controller that provides control to display the at least one bookmark point on a thumbnail screen image of the Web page screen image.

To achieve the above objects, there is also provided a process readable recording medium having a program recorded to execute the method by the processor.

BRIEF DESCRIPTION OF TEE DRAWINGS

The present invention will become more fully understood from the detailed description given herein below and the accompanying drawings, which are given by illustration only, and thus are not limitative of the present invention, and wherein.

Figure 23:
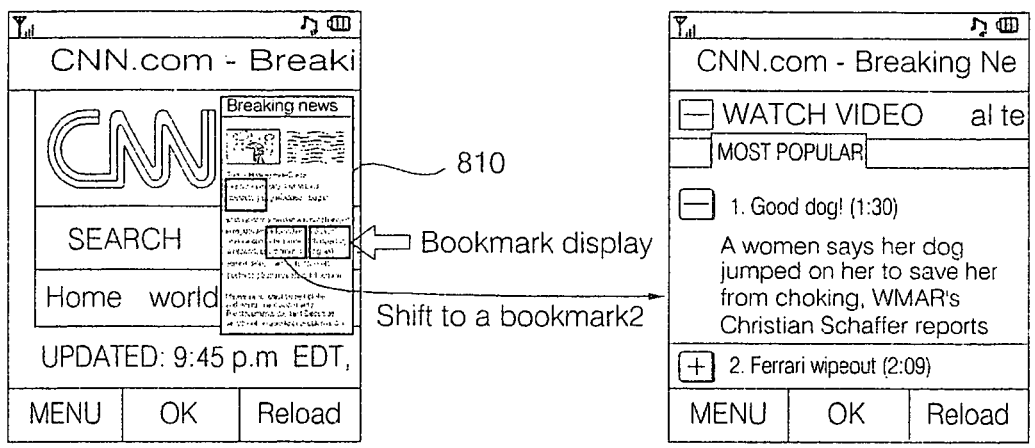

FIG. 23 conceptually shows screen images of displaying of and shifting to bookmark points set on a particular Web page in the mobile terminal control method according to the third exemplary embodiment of the present invention.

Figure 24:
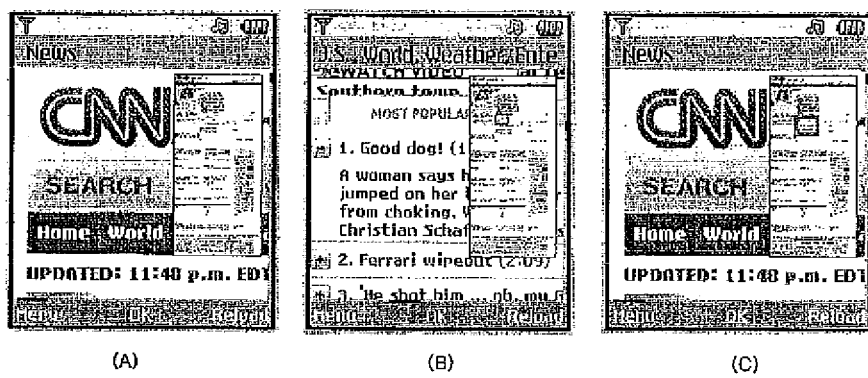

FIGS. 24A to 24C show screen images for explaining a procedure of displaying bookmark points on a thumbnail screen image in the mobile terminal control method according to the third exemplary embodiment of the present invention.

Figure 25:
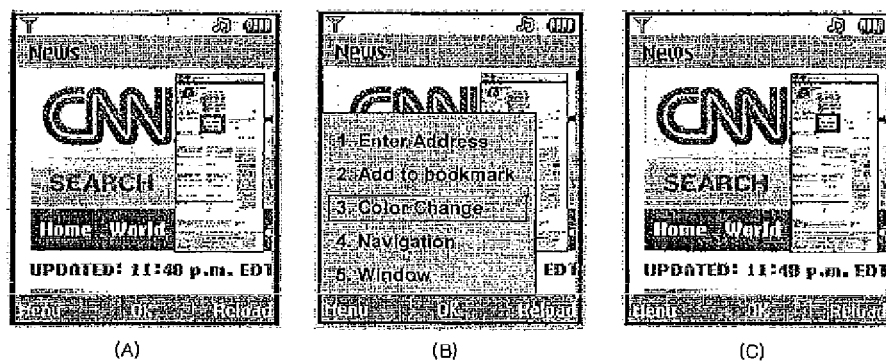

FIGS. 25A to 25C show screen images for explaining a procedure of setting the color of a bookmark point display diagram in the mobile terminal control method according to the third exemplary embodiment of the present invention.

Figure 26:
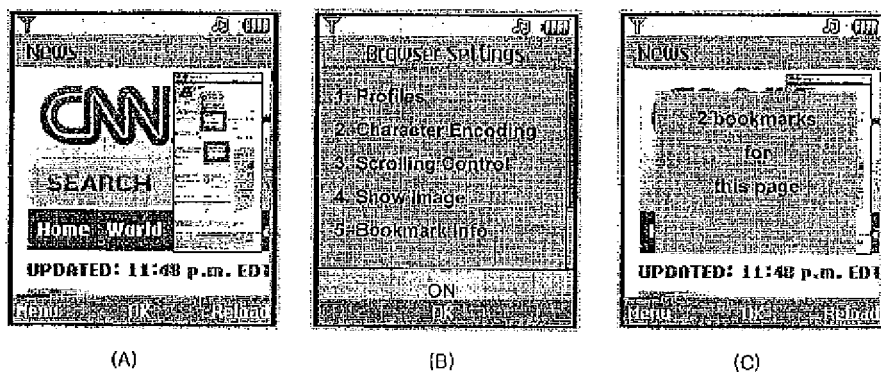

FIGS. 26A to 26C show screen images for explaining a procedure for setting whether to display the number of bookmarks in the mobile terminal control method according to the third exemplary embodiment of the present invention.

DETAILED DESCRIPTION OF THE PREFERRED EMBODIMENT

A mobile terminal according to exemplary embodiments of the present invention will now be described in detail with reference to the accompanying drawings.

The mobile terminal presented in the following description may include mobile phones, smart phones, notebook computers, digital broadcast terminals, personal digital assistants (PDAs), portable multimedia players (PMP), navigators, and the like.

Figure 1:
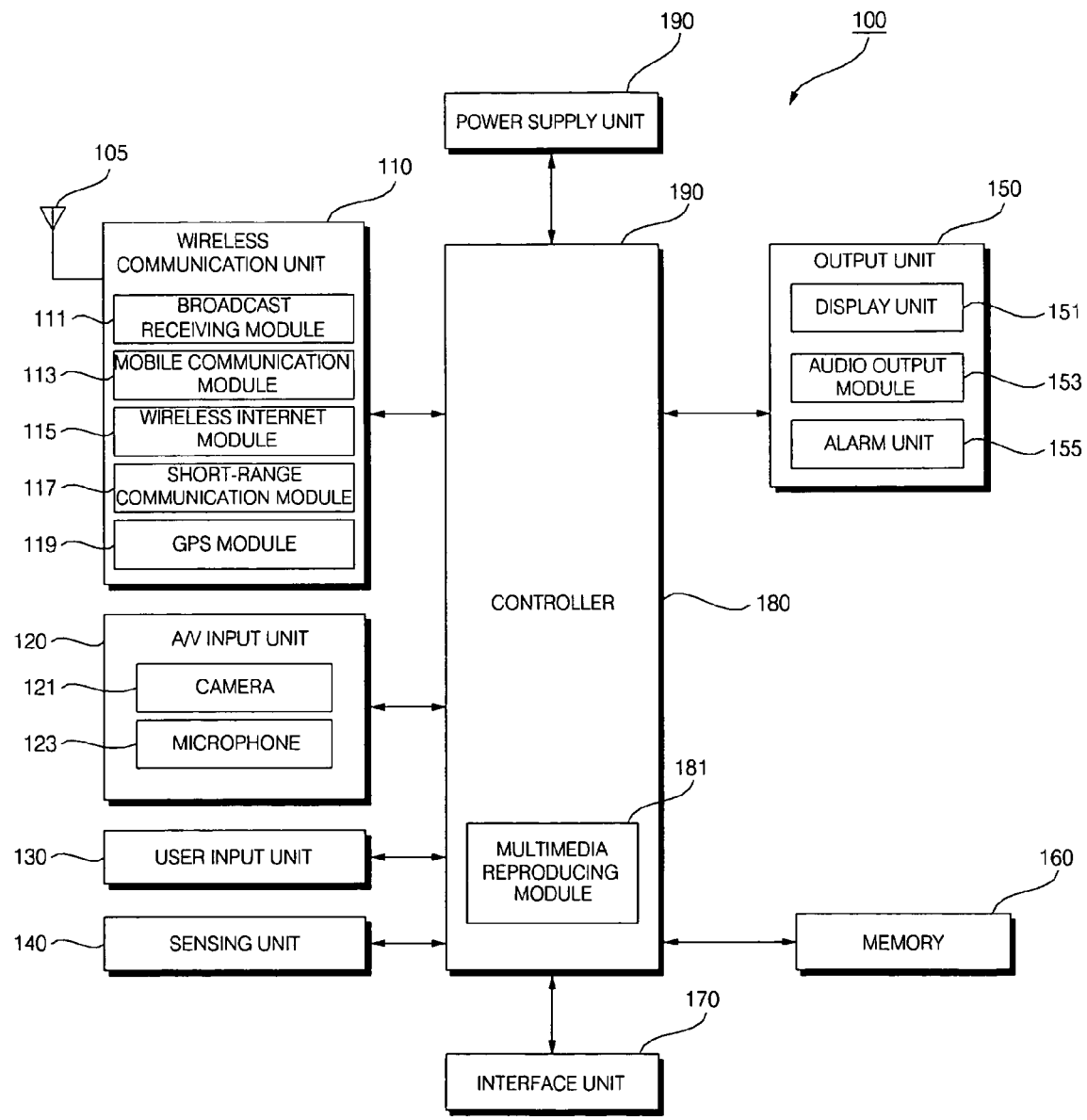
FIG. 1 is a schematic block diagram of a mobile terminal according to an exemplary embodiment of the present invention.

FIG. 1 is a schematic block diagram of a mobile terminal according to an exemplary embodiment of the present invention. The mobile terminal according to an exemplary embodiment of the present invention will now be described from the perspective of its functions.

With reference to FIG. 1, a mobile terminal 100 may include a wireless communication unit 110, an A/V (Audio/Video) input unit 120, a user input unit 130, a sensing unit 140, an output unit 150, a memory 160, an interface unit 170, a controller, and a power supply unit 190. When these elements are actually implemented in the mobile terminal, if required, two or more elements may be combined together or one particular element may be divided into two or more elements.

The wireless communication unit 110 may include a broadcast receiving module 111, a mobile communication module 113, a wireless Internet module 115, a short-range communication module 117, and a GPS (global positioning system) module 119.

The broadcast receiving module 111 receives at least one of a broadcast signal and broadcast associated information from an external broadcast management server via a broadcast channel. In this case, the broadcast channel may include a satellite channel and a terrestrial channel. The broadcast management server may refer to a server that generates and transmits at least one of the broadcast signal and the broadcast associated information or a server that receives at least one of a previously generated broadcast signal and broadcast associated information and sends the same to the mobile terminal.

The broadcast associated information may refer to information associated with a broadcast channel, a broadcast program, or a broadcast service provider, etc. The broadcast signal may include not only a TV broadcast signal, a radio broadcast signal, and a data broadcast signal, but also a broadcast signal obtained by combining the data broadcast signal to the TV broadcast signal or the radio broadcast signal. The broadcast associated information may be provided via a mobile communication network, and in this case, it may be received by the mobile communication module 113. The broadcast associated information may exist in various formats. For instance, the broadcast associated information may exist in various formats. For example, the broadcast associated information may exist as an electronic program guide (EPG) of digital multimedia broadcasting (DMB), an electronic service guide (ESG) of digital video broadcast-handheld (DVB-H), and the like.

The broadcast receiving module 111 receives broadcast signals by using various types of broadcast systems. In particular, the broadcast receiving module 111 may receive digital broadcast signals by using digital broadcast systems such as Digital Multimedia Broadcasting-Terrestrial (DMB-T), Digital Multimedia Broadcasting-satellite (DMB-S), Media Forward Link Only (MediaFLO™), Digital Video Broadcast-Handheld (DVB-H), Integrated Services Digital Broadcast-Terrestrial (ISDB-T), and the like. In addition, the broadcast receiving module 111 may be configured to be suitable for every broadcast system that provides broadcast signals, as well as for the digital broadcasting systems. Broadcast signals and/or broadcast associated information received via the broadcast receiving module 111 may be stored in the memory 160.

The mobile communication module 113 transmits/receives radio signals to/from at least one of a base station, an external terminal, a server in a mobile communication network. Here, the radio signals may include a voice call signal, a video call signal, or various formats of data according to transmission/reception of text/multimedia messages.

The wireless Internet module 115 refers to a module for supporting a wireless network access. This module may be internally or externally coupled to the mobile terminal 100. The short-range communication module 117 refers to a module for supporting short range communications. Examples of a short-range communication technology includes Bluetooth™, Radio Frequency IDentification (RFID), Infrared Data Association (IrDA), Ultra-WideBand (UWB), ZigBee™, and the like. The GPS module 119 receives location information from a plurality of GPS artificial satellites.

The A/V input unit 120 is configured to input an audio or video signal. The A/V input unit 120 may include a camera 121 and a microphone 123. The camera 121 processes image frames of still pictures or videos obtained by an image sensor in a video call mode or in an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile terminal 100.

The microphone 123 receives external audio signals via a microphone in a phone call mode, a recording mode, a voice recognition mode, and the like, and processes the same into electrical audio (voice) data. The processed audio (voice) data may be converted for output into a format transmittable to a mobile communication base station via the mobile communication module 113 in case of the phone call mode. The microphone 123 may include various types of noise canceling algorithms to cancel noise generated in the course of receiving external audio signals.

The user input unit 130 generates key input data inputted by a user to control operations of the mobile terminal. The user input unit 130 may include a keypad, a dome switch, a touch pad (e.g., static pressure/capacitance), a jog wheel, a jog switch, a finger mouse, and the like. In particular, when the touch pad is overlaid on the display unit 151 in a layered manner, it may be called a touch screen.

The sensing unit 140 detects a current state of the mobile terminal 100 such as an open/close state of the mobile terminal 100, a location of the mobile terminal 100, presence or absence of user contact with the mobile terminal 100, etc., and generates a sense signal for controlling the operation of the mobile terminal 100. For example, if the mobile terminal 100 is a slide type mobile phone, the sensing unit 140 may sense whether the slide phone is opened or closed. In addition, the sensing unit 140 can detect a sensing function as to whether or not the power supply unit 190 supplies power or whether or not the interface unit 170 is coupled with an external device.

The display unit 151 outputs information processed in the mobile terminal 100. For example, when the mobile terminal 100 is in the phone call mode, the display unit 151 displays a User Interface (UI) or a Graphic User Interface (GUI) associated with a call. When the mobile terminal 100 is in the video call mode or the image capturing mode, the display unit 151 may separately and simultaneously display a captured and/or received image, and display a UI, a GUT, and the like.

Meanwhile, when the display unit 151 and the touch pad are overlaid in a layered manner to form a touch screen, the display unit 151 may function as both an input device and an output device. If the display unit 151 is formed as a touch screen, the display unit 151 may include a touch screen panel, a touch screen panel controller, and the like. In this case, the touch screen panel is a transparent panel attached on an outer side, which can be connected to an internal bus of the mobile terminal. The touch screen panel waits for contact results, and when a touch input is performed, the touch screen panel transmits corresponding signals to the touch screen panel controller. The touch screen panel controller processes the signals and transmits corresponding data to the controller 180 to allow the controller 180 to recognize whether or not a touch input has been performed or which region has been touched if a touch input has been performed.

The display unit 151 may include at least one of a Liquid Crystal Display (LCD), a Thin Film Transistor-LCD (TFT-LCD), an Organic Light Emitting Diode (OLED), a flexible display, and a three-dimensional (3D) display. The mobile terminal 100 may include two or more display units according to its embodiment. For example, the mobile terminal 100 may include an external display unit (not shown) and an internal display unit (not shown).

The audio output module 153 may output audio data received from the wireless communication unit 110 or stored in the memory 160 in a call signal reception mode, a call mode, a record mode, a voice recognition mode, a broadcast reception mode, and the like. Also, the audio output module 153 may output audio signals related to a particular function, e.g., related to a call signal reception sound, a message reception sound, etc., performed by the mobile terminal 100. The audio output module 153 may include a speaker, a buzzer, or the like.

The alarm unit 155 outputs a signal to inform about the occurrence of an event of the mobile terminal 100. Typical events occurring in the mobile terminal 100 may include a call signal reception, a message reception, a key signal input, etc. In addition to audio or video signal outputs, the alarm unit 155 may output a signal in a different format to inform about the occurrence of an event. For example, the alarm unit 155 may output a signal in the form of vibrations. Alternatively, when a key signal is inputted, the alarm unit 155 may output vibrations as a feedback with respect to the key signal input. By providing such vibrations, the user can recognize the occurrence of events. Signals informing about the occurrence of an event may be also outputted via the display unit 151 or the audio output module 153.

The memory 160 may store software programs or the like used for the processing and controlling performed by the controller 180, or may temporarily store inputted/outputted data (e.g., a phonebook, messages, still images, video, etc.).

The memory 160 may include at least one type of storage mediums including a flash memory type, a hard disk type, a multimedia card micro type, a card-type memory (e.g., SD or DX memory, etc), a Random Access Memory (RAM), and a Read-Only Memory (ROM). Also, the mobile terminal 100 may operate a Web storage performing a storage function of the memory 150 on the Internet.

The interface unit 170 serves as an interface with all the external devices connected with the mobile terminal 100. For example, the external devices may include wired/wireless headsets, external power chargers, wired/wireless data ports, card sockets for receiving a memory cards a Subscriber Identity Module/User Identity Module (SIM/UIM) card, etc., audio input/output (I/O) ports, video f/C ports, earphones, and the like. The interface unit 170 may be used to receive data from an external device and transfer the received data to the respective elements within the mobile terminal 100, or may be used to transfer data from the mobile terminal to an external device.

The controller 180 typically controls operations of the elements of the mobile terminal 100. For example, the controller 180 performs controlling and processing associated with voice calls, data communications, video calls, and the like. The controller 180 may include a multimedia reproducing module 181 for reproducing multimedia data. The multimedia reproducing module 181 may be configured as a hardware component within the controller 180 or may be configured as a software component separated from the controller 180.

The power supply unit 190 receives external or internal power and supplies power required for the operations of the respective elements under the control of the controller 180.

So far, the internal elements of the mobile terminal 100 have been described from the perspective of their functions, Hereinafter, external elements of the mobile terminal will be described from the perspective of their functions with reference to FIGS. 2 and 3. The mobile terminal may be implemented in a variety of different configurations including a folder-type, a bar-type, a swing-type, a slide-type, or the like. For the sake of brevity, the slide-type mobile terminal will be used as an example in the following description. However, the concepts and features described herein should not be limited to the slide-type mobile terminal, but can be applicable to any type of mobile terminals or other electronic devices including the ones as mentioned above.

Figure 2:
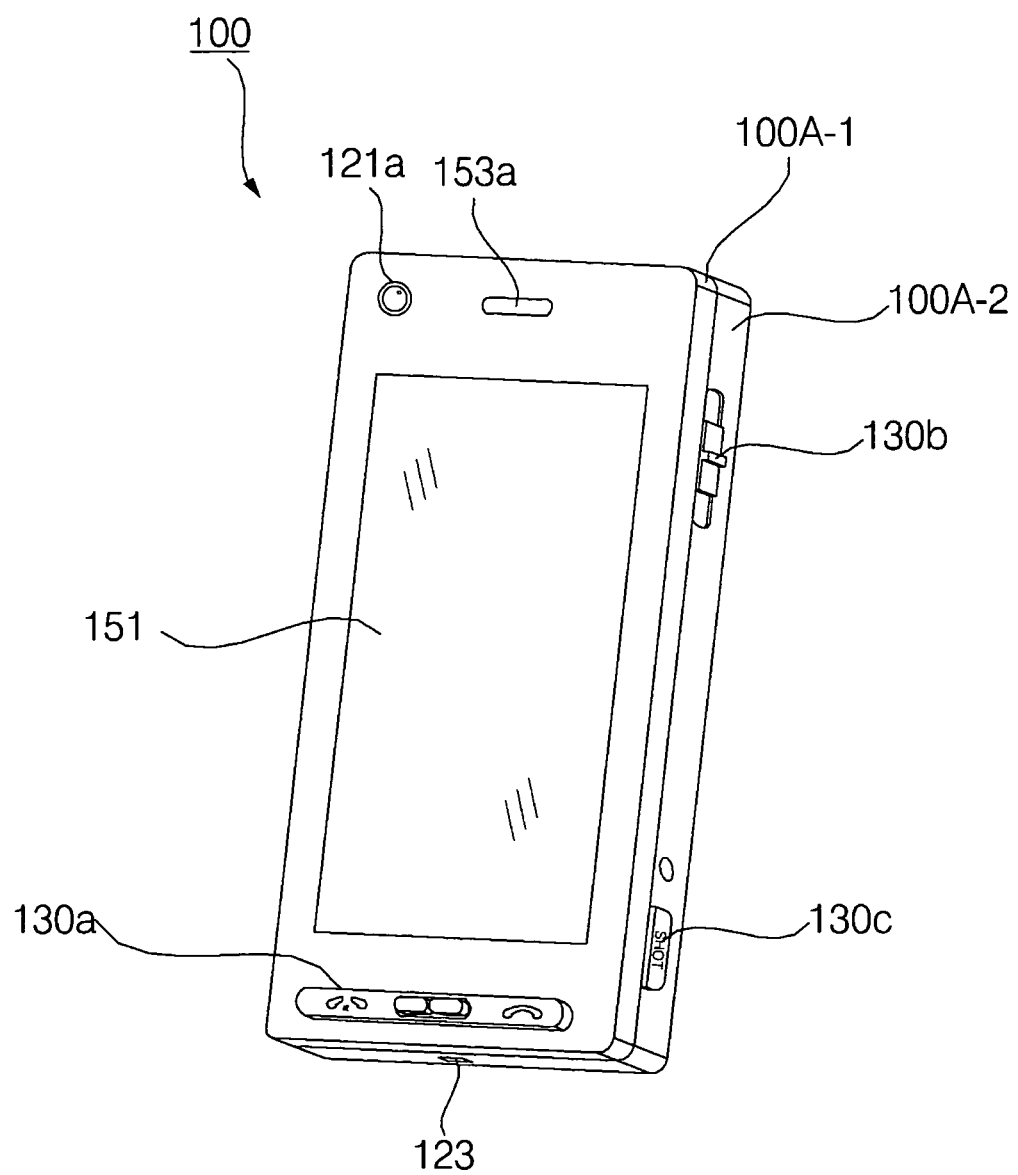
FIG. 2 is a front perspective view of the mobile terminal according to an exemplary embodiment of the present invention.

FIG. 2 is a front perspective view of the mobile terminal according to an exemplary embodiment of the present invention. With reference to FIG. 2, at least one case constituting the external appearance of mobile terminal 100 includes a first front case 100A-1 and a first rear case 100A-2. Various electronic components are installed in the space formed by the front case 100A-1 and the rear case 100A-2. One or more intermediate cases may be additionally disposed between the front case 100A-1 and the rear case 100A-2. The cases may be formed by injection-molding a synthetic resin, or made of a metallic material such as stainless steel (STS) or titanium (Ti).

The display unit 151, a first audio output module 153a, a first camera 121a and a first user input unit 130a may be disposed on the front case 100A-1. A second user input unit 130b, a third user input unit 130, and a microphone 123 may be disposed on the side of the rear case 100A-2.

The display unit 151 may include an LCD, an OLED, and the like, that visually displays information. A touch pad may be overlaid in a layered manner on the display unit 151 to allow the display unit 151 to function as a touch screen to input information according to a user's touch.

The first audio output module 153a may be implemented as a receiver or a speaker. The first camera 121a may be implemented to be suitable for a user to capture still images or video of the user and so on. The microphone 123 may be implemented to be suitable for receiving the user's voice, other sounds, etc.

The first to third manipulating units 130a, 130b and 130c may be called a manipulating portion 130, and various methods can be employed for the manipulation portion so long as it can operate by the user in a tactile manner.

The user input unit 130 may be implemented as a dome switch or touch pad that can receive user instructions or information according to a user's pressing, pushing or touching operation, or implemented in the form of a wheel, a jog element, a joystick, or the like to allow user manipulation thereof. In terms of its functions, the first user input unit 130a is used for inputting commands such as start, end, call or the like, and the second user input unit 130b is used for selecting an operation mode. The third user input unit 130c may operate as a hot key for activating a special function of the mobile terminal 100.

Figure 3:
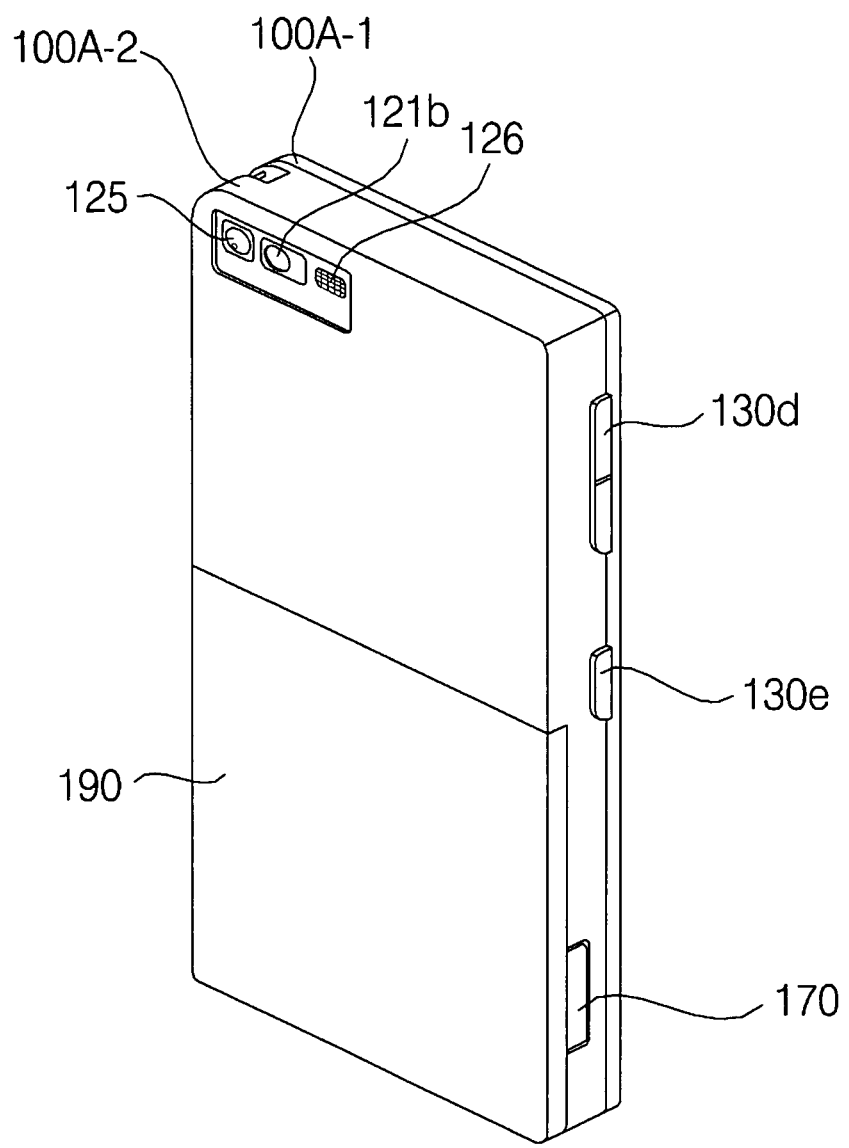
FIG. 3 is a rear perspective view of the mobile terminal according to an exemplary embodiment of the present invention.

FIG. 3 is a rear perspective view of the mobile terminal in FIG. 2. With reference to FIG. 3, a fourth user input unit 130d, a fifth user input unit 130e and an interface unit 170 may be disposed on the side of the rear case 100A-2, and a second camera 121b may be additionally mounted on the rear surface of the rear case 100A-2.

The second camera 121b may have an image capture direction which is substantially the opposite to that of the first camera 121a, and may support a different number of pixels as that of the first camera module 121a. For example, the first camera 121a may operate with a relatively lower resolution to capture the user face and transmit the same to the another party during video call communication or the like, while the second camera 121b may operate with a relatively higher resolution to capture a general subject with high picture quality and not immediately transmit the same.

A flash 125 and a mirror 126 may be additionally disposed adjacent to the second camera 121b. When an image of the subject is captured with the second camera 121b, the flash 125 illuminates the subject. The mirror 126 allows the user to see himself when he wants to capture his own image by using the second camera 121b.

The rear case 100A-2 may further include a second audio output module (not shown). The second audio output module may implement a stereophonic function in conjunction with the first audio output module 153a, and may be also used for calls in a speaker phone mode.

A broadcast signal receiving antenna (not shown) may he disposed at one side of the second rear case 100A-2, in addition to an antenna that supports mobile communications. The antenna can be configured to be retractable from the rear case 100A-2.

The interface unit 170 serves as an interface to allow the mobile terminal 100 to exchange data with an external device. For example, the interface unit 170 may be at least one of a connection port for connecting the mobile terminal to an earphone in a wired/wireless manner, a port for short-range communication, and a power supply port for supplying power to the mobile terminal 100. The interface unit 170 may card sockets for receiving external cards such as a memory card, a Subscriber Identity Module/User Identity Module (SIM/UIM) card, etc.

The power supply unit 190 for supplying power to the mobile terminal 100 is located at the second rear case 100A-2. The power supply unit 190 may be, for example, a rechargeable battery that can be detachably attached to the rear case 100A-2.

In the above description, the second camera 121b and so on is disposed on the rear case 100A-2, but the present invention is not limited thereto. In addition, even if the second camera 121b is not provided, the first camera 121a may be configured to rotate to thus allow image capturing in various directions including the image capturing direction of the second camera 121b.

Figure 4A:
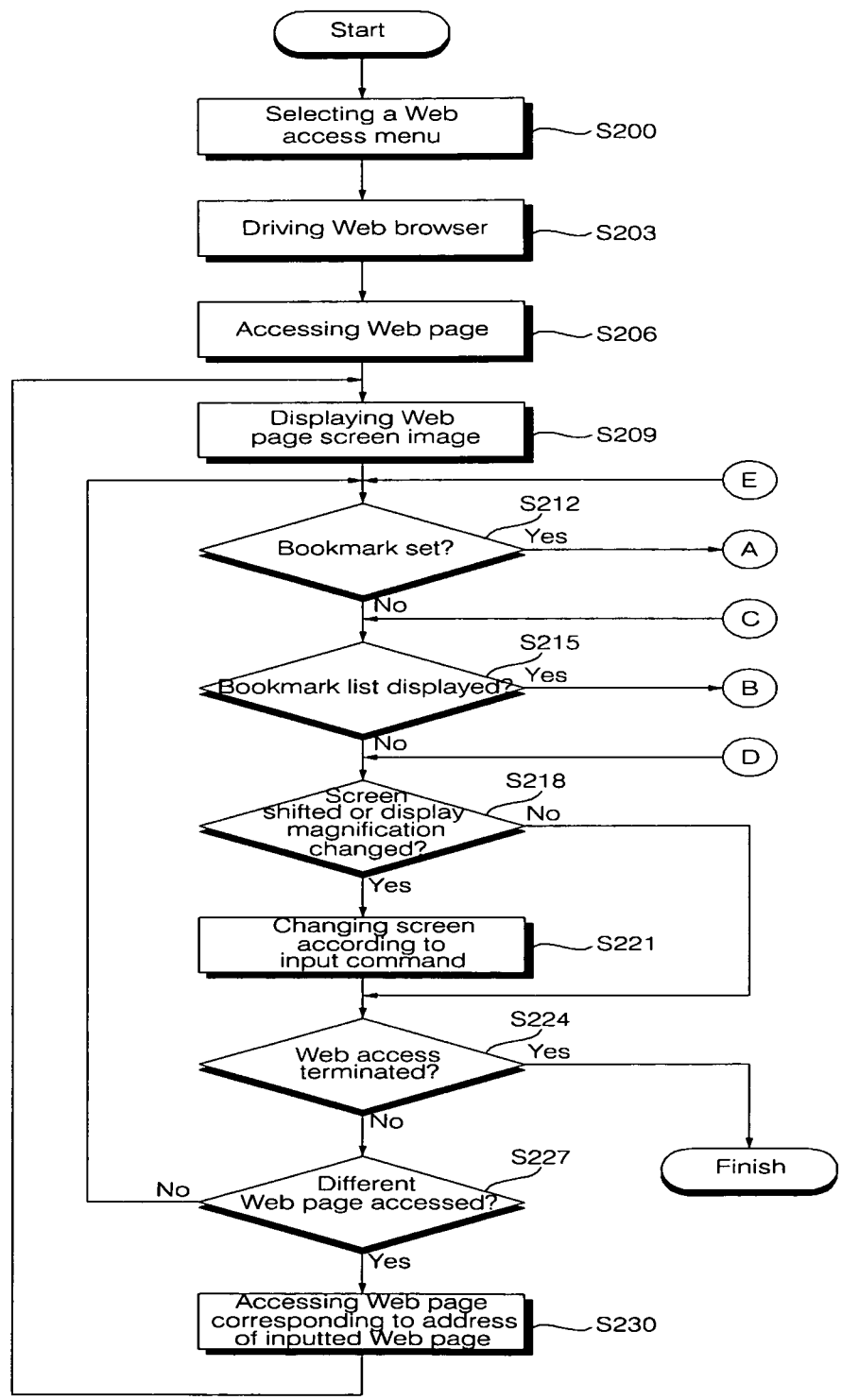
FIGS. 4A to 4C are flow charts illustrating the process of a method for controlling a mobile terminal according to a first exemplary embodiment of the present invention.
Figure 4B:
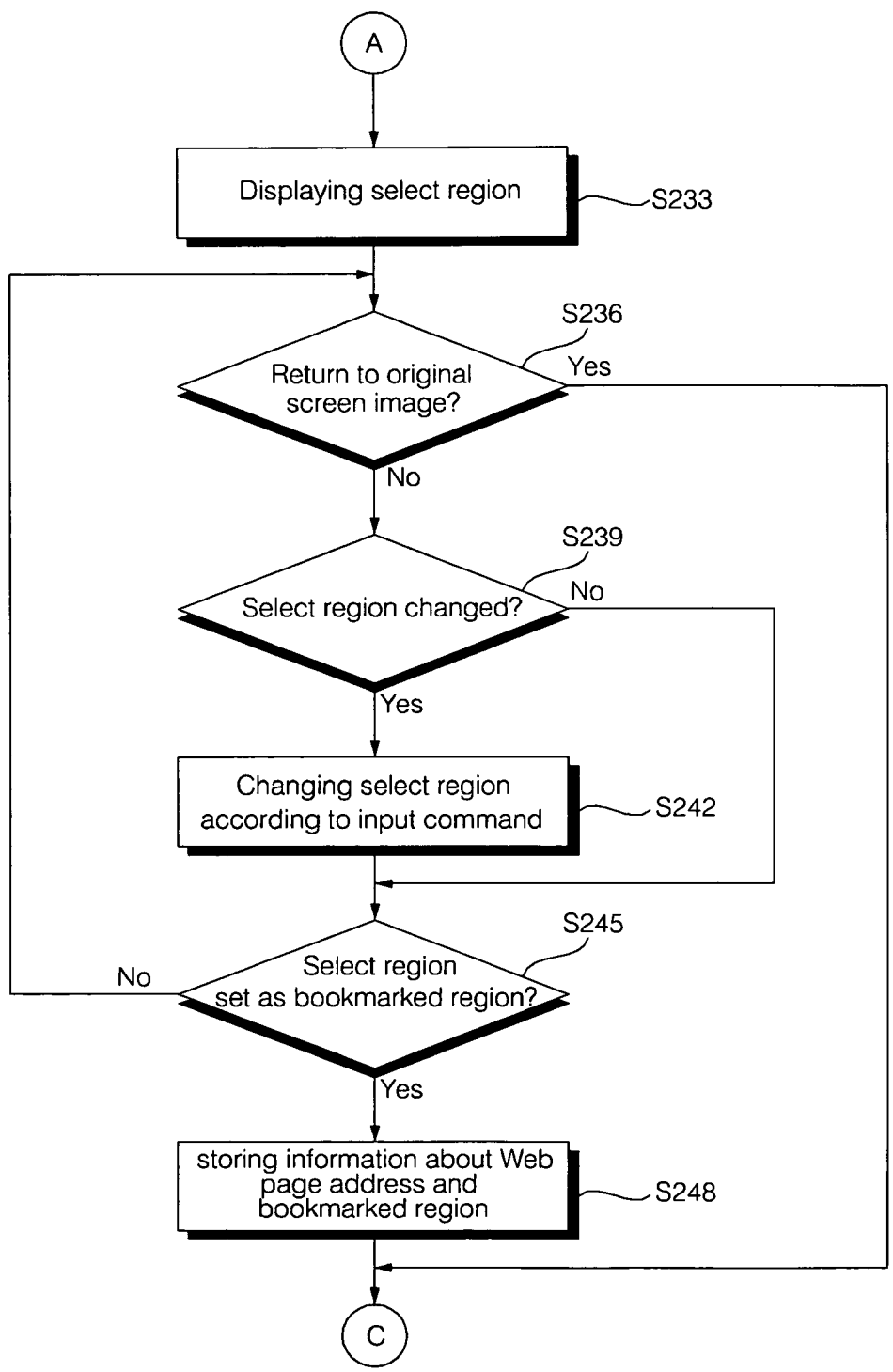
Figure 4C:
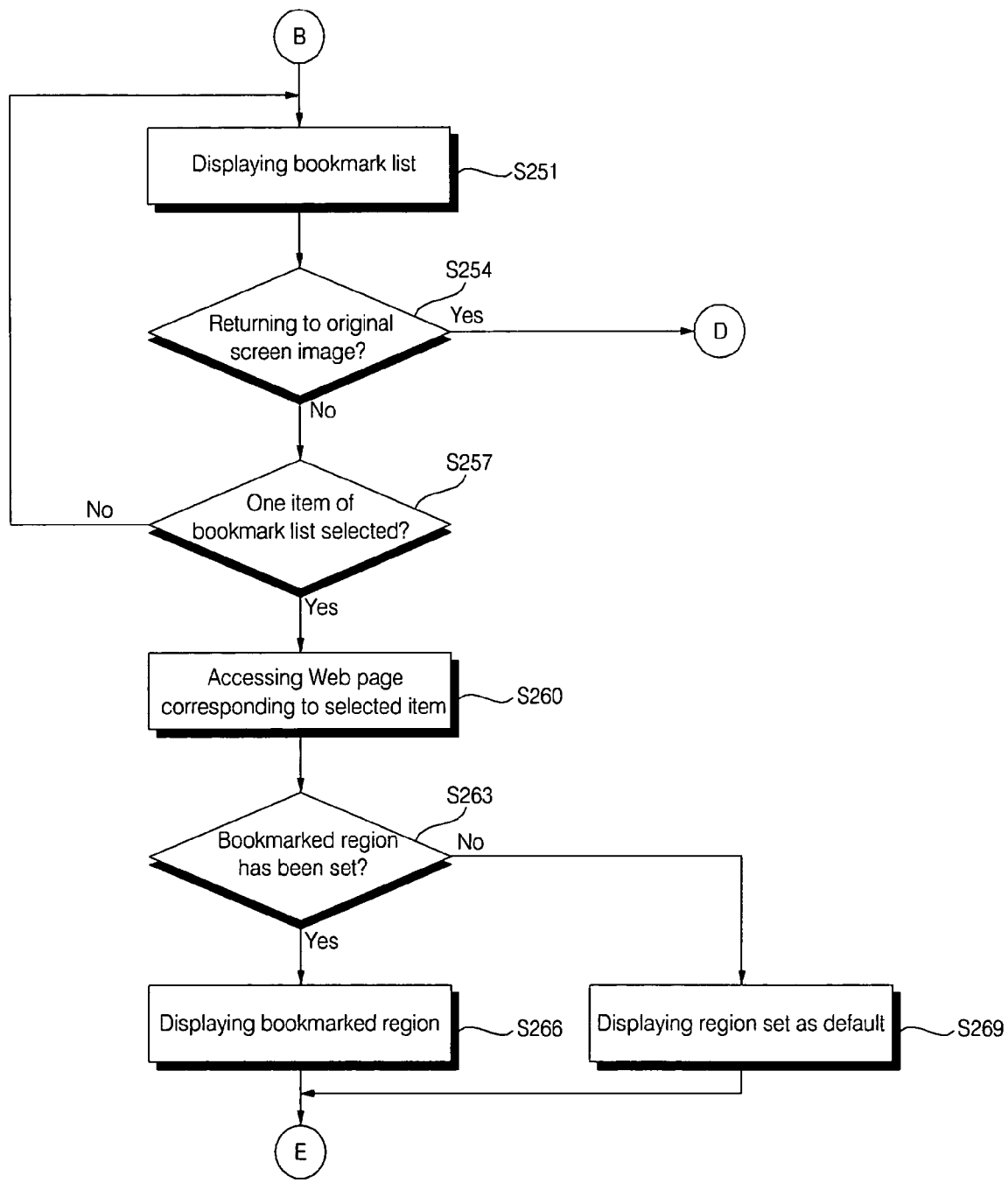

FIGS. 4A to 4C are flow charts illustrating the process of a method for controlling a mobile terminal according to a first exemplary embodiment of the present invention.

Referring to FIG. 4A, when a Web access menu is selected according to a user instruction (S200), the controller 180 drives a Web browser (S203) and provides control to connect a Web page via the wireless Internet module 115 according to the address of a Web page stored as a homepage (S206). The controller 180 controls the display unit 151 to display the accessed Web page, and a corresponding Web page screen image is displayed on the display unit 151 (S209).

If a region on the Web page screen image displayed on the display unit 151 formed as a touch screen is selected according to a touch input or if setting of a bookmark is requested through a menu selection, the controller 180 provides control to perform the process as shown in FIG. 4B (S212). When a bookmark list is requested to be displayed through a menu selection, the controller 180 provides control to perform the process as shown in FIG. 4C (S215).

If a Web page screen image is requested to be shifted or display magnification is requested to be changed (S218), the controller 180 provides control to change the screen according to inputted instructions such as shifting a region of the entire image of the Web page or reducing or magnifying the screen image (S221).

If accessing a different Web page is requested (S227), the controller 180 accesses a corresponding Web page according to an inputted address of the Web page (S230) and performs the process following step S212. Such process is repeatedly performed until an end of the Web access menu is selected (S224).

FIG. 4B shows a process performed when a bookmark is requested. With reference to FIG. 4B, the controller 180 displays a region selected from a screen image of the Web page by a touch input or in other manners (S233). In this state, if returning to an original screen image is desired without setting a bookmark, the controller provides control to return to step S215, and if an instruction (command) for changing a select region is inputted, the controller 180 provides control to change the select region according to the inputted instruction (S242). The changing of the select region includes changing of the size of the select region, changing of a display magnification, shifting the select region on the screen image of the Web page, displaying a particular position, etc.

If the select region is set as a bookmarked region (S245), the corresponding address of the Web page and information about the bookmarked region are stored (S248). In this case, the bookmarked region refers to a region to be displayed as an access screen image when the Web page is re-accessed through a bookmark list in the entire Web pages.

FIG. 4C shows a process performed when displaying of a bookmark list is requested, Bookmarking refers to storing a link corresponding to a particular Web page in the form of a list to allow a user to each enter the particular Web page. With reference to FIG. 4C, the controller 180 displays a bookmark list on the display unit 151 (S251), and if returning to the original screen image is requested, the controller provides control to return to step S218 (S254).

If one item on the bookmark list is selected (S239), the controller 180 accesses a Web page corresponding to the selected item with reference to the bookmark information stored in the memory (S260). If the accessed Web page includes a set bookmarked region, the bookmarked region is displayed as an initial access screen image (S266). If the access Web page does not have a set bookmarked region, the controller 180 provides control to display the entire Web page screen image or a region set as default (S269).

Alternatively, before an initial access screen image is displayed, automatic log-in process may be performed to a website accessed by using registered log-in authentication information, and a Web page provided from the logged-in website may be then displayed. In this case, when bookmark information is stored, it is required to store the log-in authentication information including a user ID and a password, and the stored log-in authentication information may be ciphered to be stored.

Through such process, when the Web page, for which the bookmarked region has been set, is re-accessed through the bookmark, the bookmarked region can be displayed as an initial access screen image.

Figure 5:
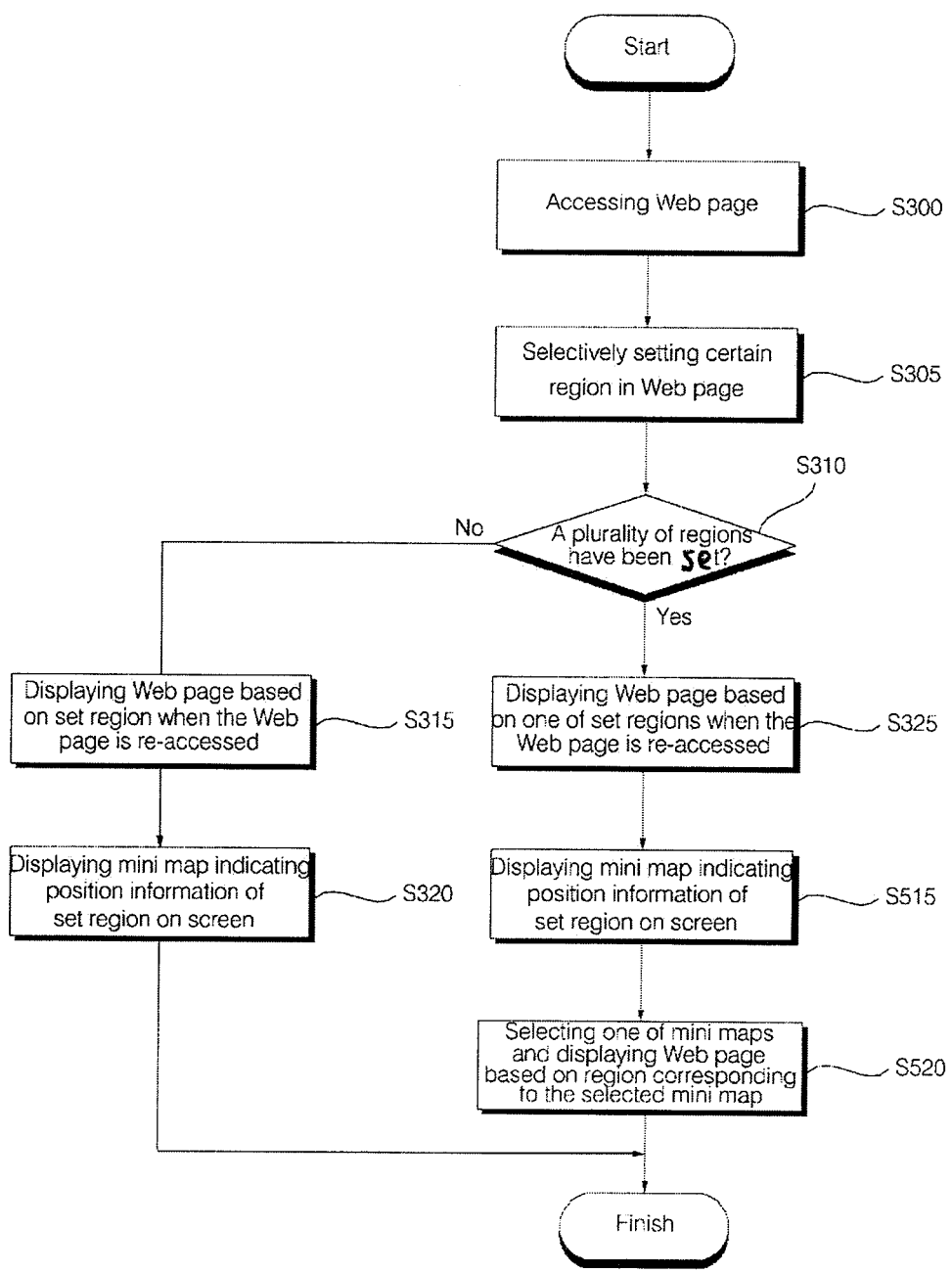
FIG. 5 is a flow chart illustrating the process of a method for controlling a mobile terminal according to a second exemplary embodiment of the present invention.

FIG. 5 is a flow chart illustrating the process of a method for controlling a mobile terminal according to a second exemplary embodiment of the present invention.

Due to the difference between the size of a Web page and the size of the screen of the display unit, only a portion of the entire Web page as accessed is displayed. In this case, generally, a left upper region of the Web page is first displayed. Thus, the user should search other regions of the Web page one by one by operating a navigation key or a number key of the user input unit 130. In the present exemplary embodiment, in order to increase the efficiency of Web page searching in the mobile terminal, a certain region of the entire regions of the Web page is selectively set during a Web page search period by the user and stored, and then when the Web page is re-accessed, the set region is centrally displayed on the screen. This will now be described.

Referring to FIG. 5, the controller 180 accesses a certain Web page by driving the Web browser (S300). The controller 180 selectively sets a certain region of the Web page (S305). The set region may be, for example, one of a log-in region including a log-in window, a search region including a search window, a select window region including a select window, and a link region including a hyperlink. The set region may be any region that is most frequently searched by the user in the Web page, without being limited to the log-in region, the search region, the select region, and the link region. The set Web page, the position information about the set region in the Web page, its associated programming source information, etc., may be stored in the memory 160.

If a single region is set, the controller 180 provides control to display a screen image of the Web page based on the set region when the Web page having the set region is re-accessed (S315).

As an initial screen image of the Web page having the set region, the set region (one of log-in region, search region, select region, and link region) is displayed. By displaying the set region as the initial screen image, the user can easily access the frequently searched region.

Next, the controller 180 may further display a mini map indicating position information of the set region on a portion of the screen when the Web site is re-accessed (S320). The mini map, which indicates the set region, may be indicated in various forms such as a square box, an icon, a number, etc. In addition, the mini map may include a mini Web page that may be displayed by reducing the entirety of the accessed Web page and also reducing the set region set within the Web page.

Such mini map may be used as follows. Namely, in a state that the Web page is accessed with the mini map displayed thereon, a different region of the Web page may be searched, and when the minimum is selected by using a select cursor or the like, the Web page may be displayed based on a set region corresponding to the selected mini map on the screen. Further, if the mini map is implemented in the form of a mini homepage and if a reduced set region in the mini homepage is selected by using the select cursor or the like, the Web page may be displayed based on the reduced set region as selected on the screen.

If a plurality of regions have been set (S310), the controller 180 may provide control to display the Web page as an initial screen image based on one of the set regions when the set Web page is re-accessed (S325). Here, one of the set regions may be a region selected by a select signal from the user input unit 130, or the first set region or the finally set region.

The selection is possible before or after accessing a Web page. Namely, before accessing the Web page, the plurality of set regions are displayed on the screen of the display unit and one of the set regions may be selected by the select signal from the user input unit 130. In addition, after accessing the Web page, the plurality of set regions are displayed on the screen of the display unit and one of the set regions may be selected by the select signal from the user input unit 130.

If the select signal is inputted from the user input unit 130, the controller 180 may display one of the set regions again. In this case, the select signal may be inputted by a navigation key or a number key of the user input unit 130. For example, if a drag signal in a certain direction is inputted from the navigation key, a different set region corresponding to the direction, not an already displayed set region, may be displayed on the screen. If a certain number is inputted from the number keys, a different set region corresponding to the inputted number, not an already displayed set region, may be displayed on the screen. Namely, in the state that the Web page is re-accessed, each time a select signal is inputted by the user input unit 130, the set regions in the homepage can be successively searched. Accordingly, a search time taken for searching the frequently searched regions in the homepage can be considerably reduced.

The controller 180 may further display a mini map indicating position information of a set region on a portion of the screen when the website is re-accessed (S330). If a plurality of regions have been set, a plurality of mini maps may be displayed on portions of the screen. The mini map, which indicates a set region, may be displayed in various forms such as a square box, an icon, a number, etc., on a portion of the screen. The mini maps implemented in the square box shape may be discriminated by differentiating the thickness of its edges, color, shade, etc. Or, the number or icon may be differentiated. In addition, the mini map may include a mini Web page displayed by reducing the entirety of the accessed Web page and also displaying the set regions in the Web page, When the mini map is implemented as a mini homepage, the plurality of set regions may be reduced in the mini homepage, and in this case, the reduced set regions may be discriminated by differentiating the thickness of an edging portion (framed portion), color, shade, the number, the icon, etc. Also, the set regions corresponding to the mini map can be discriminated by differentiating the thickness of an edging portion, color, shade of the set regions, the number, and the icon.

The controller 180 provides control to select one of the mini maps and display the Web page based on a region corresponding to the selected mini map on the screen (S335).

Namely, in the state that the Web page with the mini maps displayed is accessed, a different region of the Web page may be searched. In this case, if one mini map is selected by using a select cursor or the like, the Web page may be displayed based on a set region corresponding to the selected mini map on the screen. In addition, when the mini map is implemented in the form of a mini homepage, one of the reduced set regions in the mini homepage may be selected by using the select cursor or the like. Then, the Web page may be displayed based on a set region corresponding to the reduced set region as selected on the screen.

Through such process, after the Web page is accessed, the set region or one of set regions may be selected and the Web page may be displayed based on the select region on the screen. In addition, when the website is re-accessed, a mini map indicating location information of the set region can be further displayed on a portion of the screen.

Figure 6A:
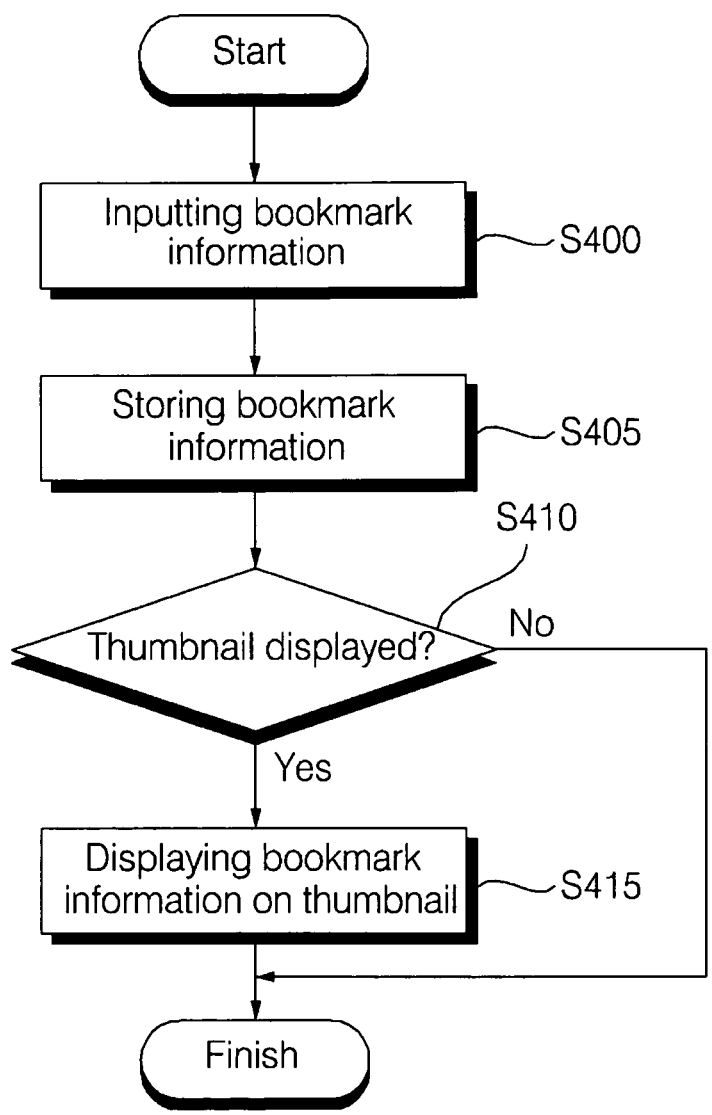
FIGS. 6A to 6C are flow charts illustrating the process of a method for controlling a mobile terminal according to a third exemplary embodiment of the present invention.
Figure 6B:
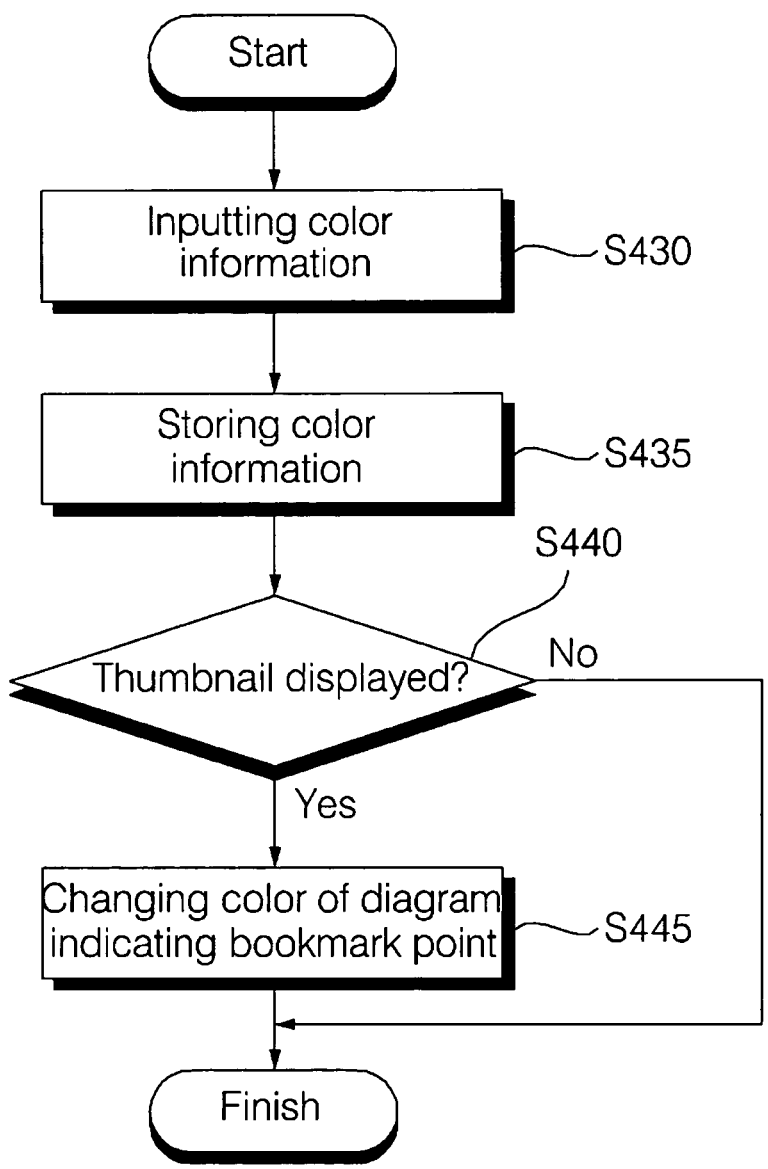
Figure 6C:
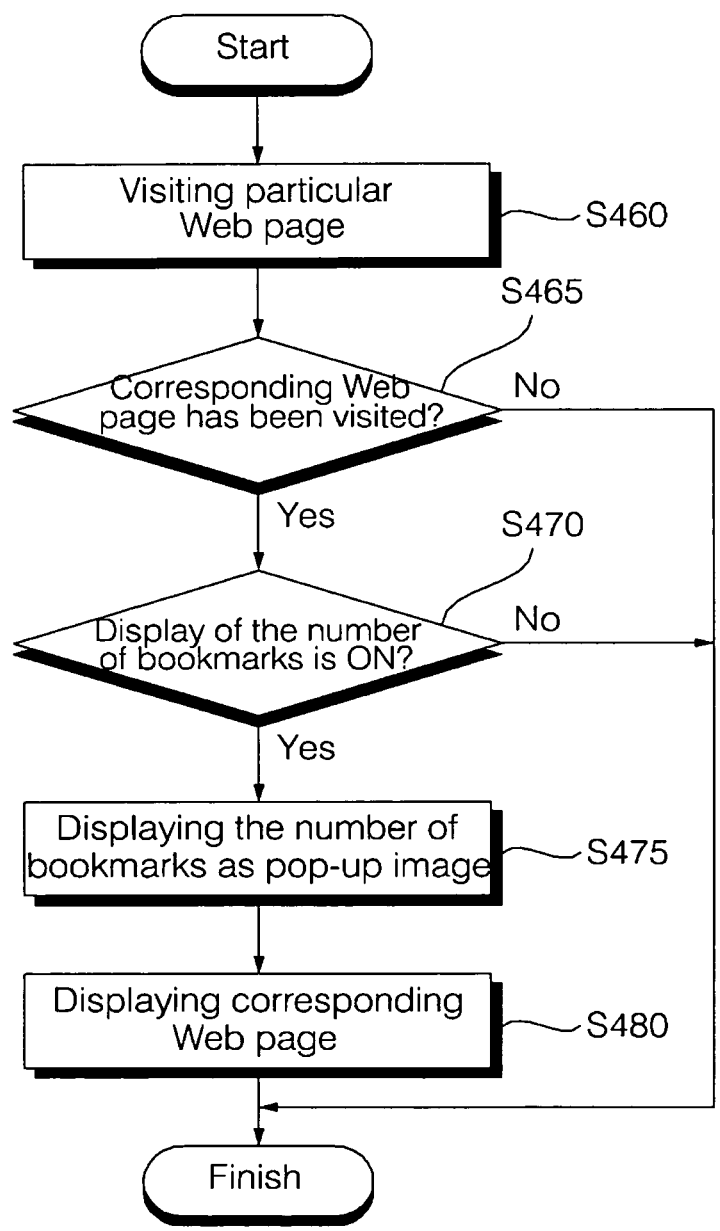

FIGS. 6A to 6C are flow charts illustrating the process of a method for controlling a mobile terminal according to a third exemplary embodiment of the present invention. In the third exemplary embodiment of the present invention, a method for effectively displaying at least one bookmark information set during Web browsing will be explained.

First, FIG. 6A is a flow chart illustrating the process of setting and displaying a bookmark point, As shown in FIG. 6A, the user may set whether or not bookmark information is to be displayed in a browser setting menu by using the user input unit 130. In this state, when the user inputs (sets) bookmark information, namely, one or more bookmark points in a particular Web page (S400), the controller 180 stores the designated bookmark information in the memory 160 (S405) and checks whether a thumbnail screen image is currently displayed on the display screen of the mobile terminal (S410). The thumbnail screen image refers to a mini screen image displaying the summary of the Web screen image. Whether or not to display the thumbnail screen image can be set by the user.

If a thumbnail screen image is currently displayed on the display screen, the controller 180 displays the bookmark information set by the user on the corresponding thumbnail screen image as displayed (S415).

FIG. 6B is a flow chart illustrating a process of setting color of a bookmark display diagram (figure).

Referring to FIG. 6B, the user may change the color of a diagram indicating a bookmark displayed on a current thumbnail screen image from an option menu. When a new bookmark display color is inputted by the user from the option menu (S430), the controller 180 stores the inputted new color information in the memory 160 (S435), and checks whether a thumbnail screen image is displayed on the current display screen of the mobile terminal (S440). If a thumbnail screen image is displayed on the current display screen, the controller 180 changes the color of a diagram displayed on the current thumbnail screen image into the new color so as to be displayed (S455).

FIG. 6C is a flow chart illustrating the process of setting displaying of the number of bookmarks.

As shown in FIG. 6C, when the user visits (accesses) a certain Web site via the wireless communication unit 110 (S460), the controller 180 checks whether the user has visited the corresponding page before (S465, S470). If the user has not visited the page, the controller 180 displays the corresponding page on the display unit 151 as it is (S480). If the user has visited the page, the controller 180 checks whether the user has set whether or not to display the bookmark information, namely, display of the number of bookmarks, as 'ON (activated)' from a browser setting menu (247C).

If the display of the number of bookmarks has been set as 'ON' from the browser setting menu, the controller 180 displays the number of bookmarks set by the user as a pop-up image (S475) and displays the corresponding Web page (S480).

Through such process, the bookmark point previously designated by the user can be displayed on the thumbnail screen image in the color that facilitates discernment of the bookmark point, and the number of designated bookmark points can be displayed.

FIGS. 7 to 16 show screen images displayed on a display unit to explain the mobile terminal control method according to the first exemplary embodiment of the present invention.

Figure 7:
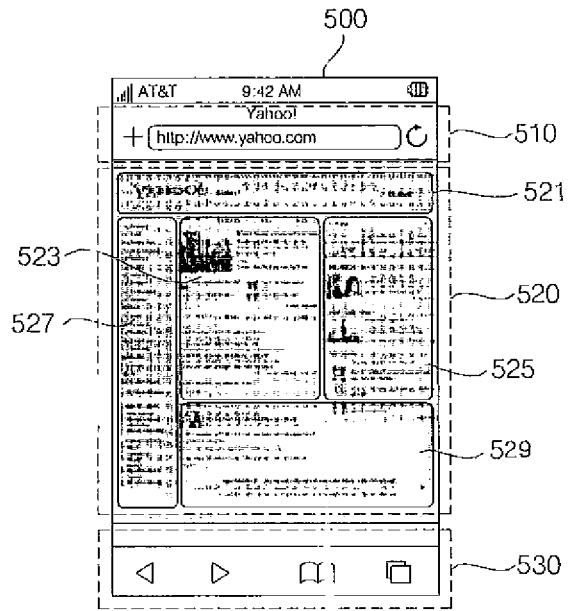
FIGS. 7 to 16 show screen images displayed on a display unit to explain the mobile terminal control method according to the first exemplary embodiment of the present invention.

FIG. 7 shows a Web browser screen 500 showing a Web page accessed via the Web browser. An address display window 510 showing the address of the Web page is displayed on an upper end portion of the Web browser screen 500, and a Web page screen 520 displaying the accessed Web page is displayed under the address display window 510. Menu icons 530 are displayed on a lower end of the Web browser screen 500 to control the screen, display a bookmark list, and select other menus.

The Web page screen 520 may include several frames, and the Web page screen 520 as shown in FIG. 5 includes five frames 521, 523, 525, 527, and 529.

Figure 8:
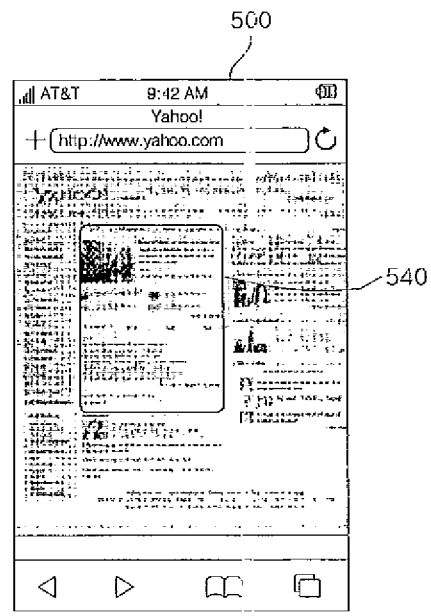

FIG. 8 shows an image that one region of the Web browser screen is selected as a select region 540. The select region 540 may be selected through a touch input or by using a pointing cursor or the like, and a Web page frame region including the touch-inputted portion or the pointing cursor-positioned portion may be selected as default.

Figure 9:
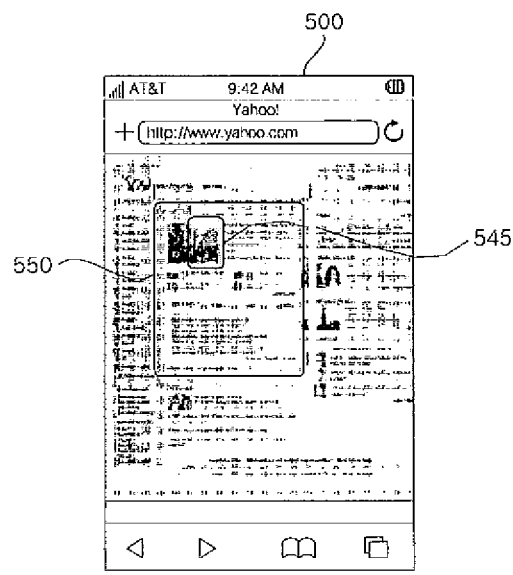
Figure 10:
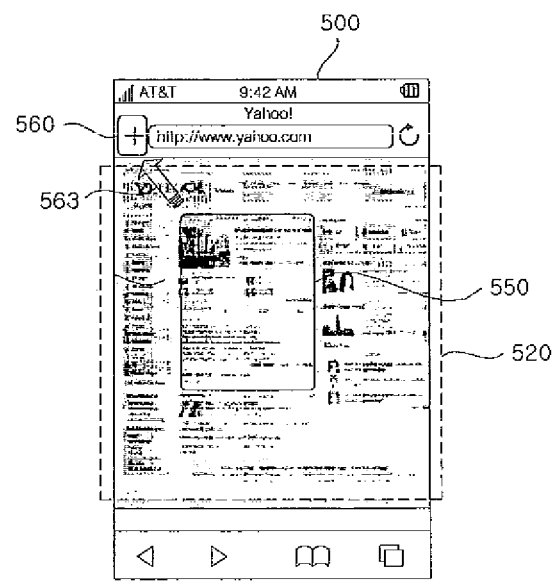

FIG. 9 shows an image that when a touch input 545 is performed via the Web page screen 520, a certain region including the touch input 545 is displayed as a select region 550. In this case, the certain region may be a Web page frame region including the touch-inputted portion, and may be set to have a certain size previously designated by the user and so on. When the select region 550 is selected, as shown in FIG. 10, one position of the select region 550 may be touched and dragged by an icon 560 for setting a bookmarked region as indicated by reference numeral 563. Then, the select region 550 may be set as a bookmarked region.

Figure 11:
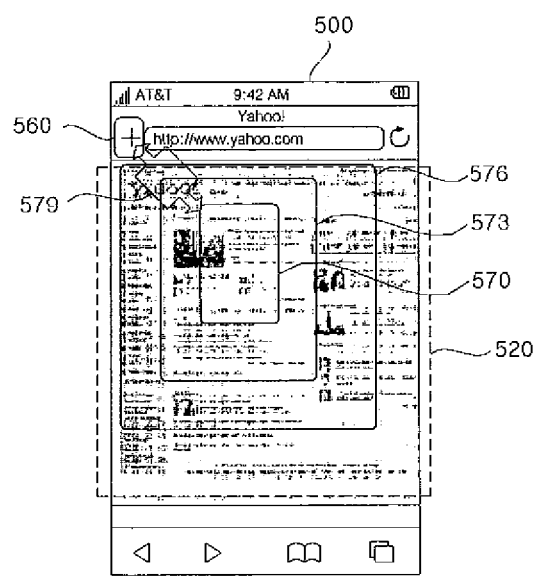
Figure 12:
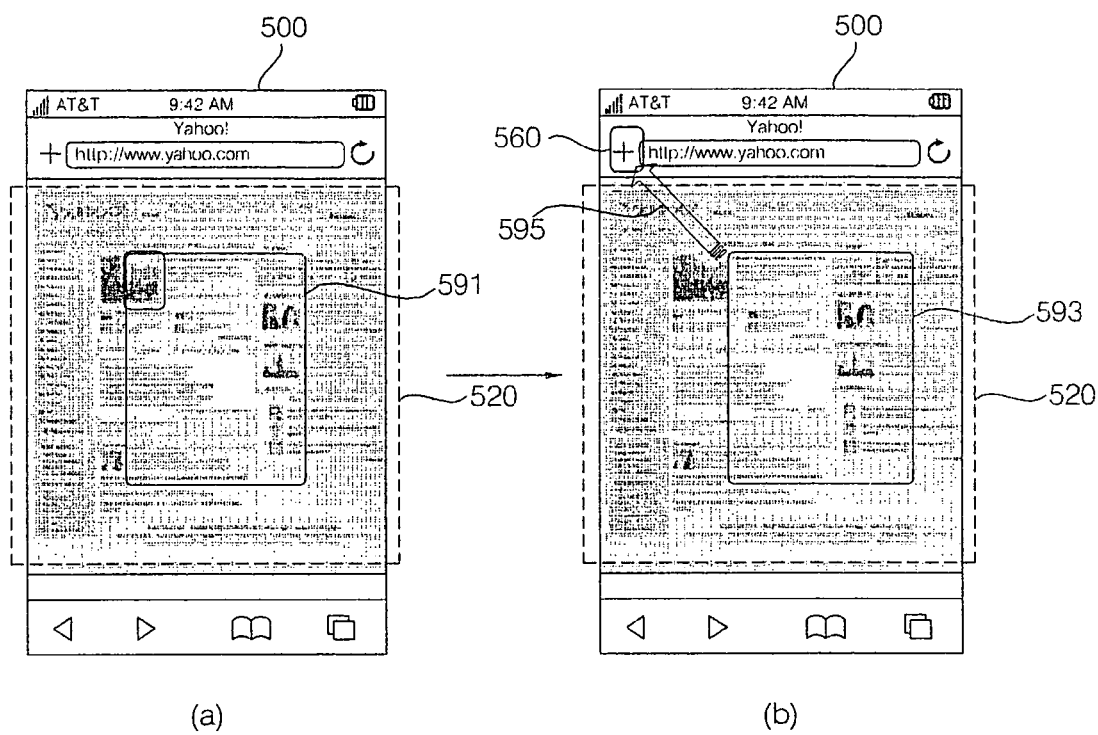

FIG. 11 shows an image that of a region 570 obtained by reducing the size of the select region 573 and a region 576 obtained by magnifying the size of the select region 573. As shown in FIG. 11, the size of the first selected select region 573 can be adjusted. The size of the select region 573 may be adjusted in various manners. For example, one of corners of the select region 573 may be touched and dragged to adjust the size of the select region 573. After the size of the select region 573 is adjusted, it can be set as the bookmarked region.

FIGS. 12a and 12b show images of shifting the first selected select region 591, respectively. As shown in FIG. 12a, when the boundary of the first selected select region 591 is selected and dragged, a shifted select region 593 is displayed as shown in FIG. 12b. When the position of a desired select region is determined, it is dragged by the icon 560 for setting a bookmarked region as indicated by reference numeral 595, and then, the shifted select region 593 may be set as a bookmarked region.

Figure 13:
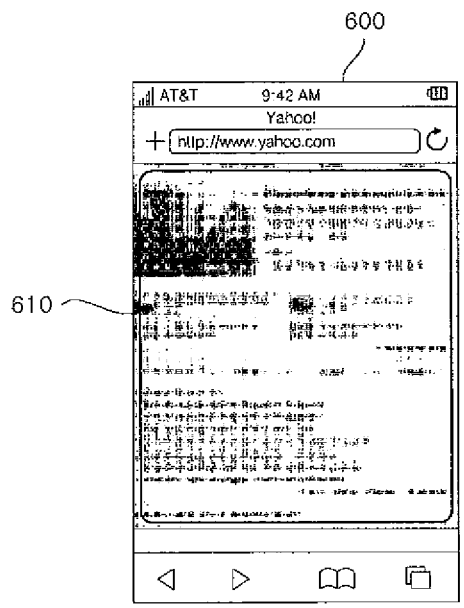
Figure 14:
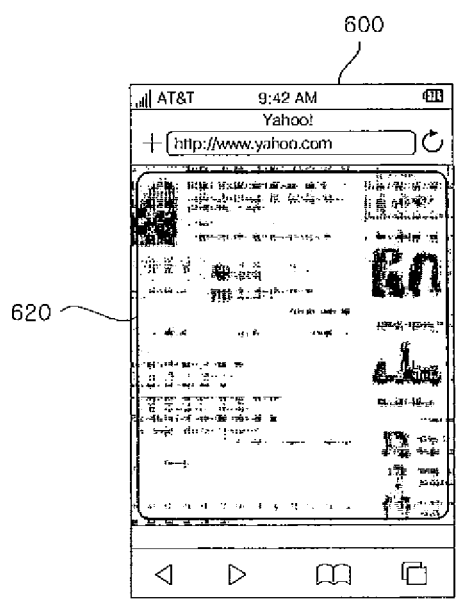
Figure 15:
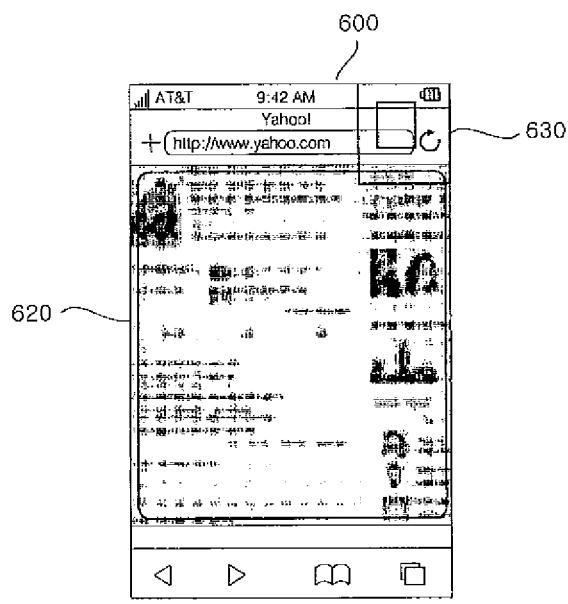

FIGS. 13 and 14 show images of an initial access screen 600 when a website is re-accessed through a bookmark list. Bookmarked regions 610 and 620 may be displayed according to a set display magnification and size on the initial access screen 600. As shown in FIG. 15, a mini map 630 indicating the position of the bookmarked region 620 in the entire Web page can be displayed at one portion of the initial accessed screen 600. The user may shift the screen image to a desired Web page region with reference to the mini map 630.

Figure 16:
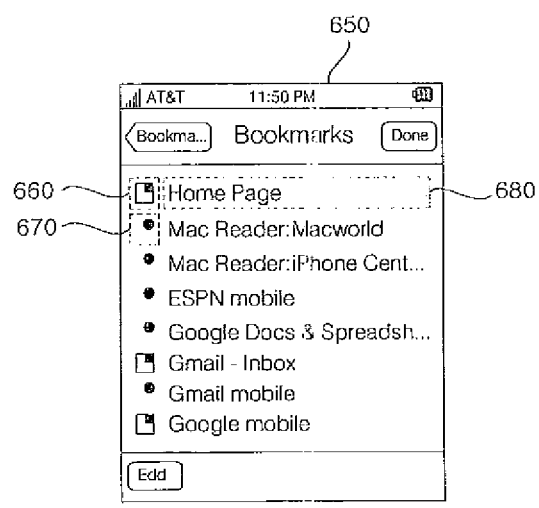

FIG. 16 shows a screen image 650 displaying a bookmark list. The screen image 650 displaying the bookmark list may discriminately display items for which the bookmarked region has been set and items for which the bookmarked region has not been set by using different identifiers. For example, an identifier indicated by reference numeral 660 may indicate an item for which the bookmarked region has been set, and an identifier indicated by reference numeral 670 may indicate an item for which the bookmarked region has not been set.

For the items for which the bookmarked region has been set, the identifier 660 may be selected to display the bookmarked region can be displayed as an initial access screen image, and the name of the item 680 may be selected to display the entire Web page or a region set as default. Besides, two identifiers may be provided for an item for which the bookmarked region has been set in order to selectively display the bookmarked region as an initial access screen image or display an accessed screen image in the same manner as a general bookmark according to a selected identifier. Alternatively, the bookmark list may be displayed by using thumbnail images of other accessed screen image.

FIGS. 17A to 17D show screen images of accessed Web pages in the mobile terminal control method according to the second exemplary embodiment of the present invention.

Figure 17A:
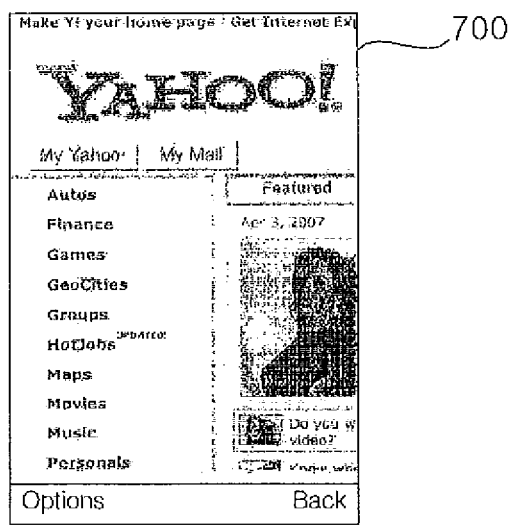
FIGS. 17A to 17D show screen images of accessed Web pages in the mobile terminal control method according to the second exemplary embodiment of the present invention.

FIG. 17A shows a general screen image 700 of the mobile terminal indicating a left upper portion of an accessed Web page when the Web page is first accessed. In the general mobile terminal when a Web page is accessed, the entirety of the Web page is searched starting from the screen image as shown in FIG. 17A, not a frequently searched region.

Figure 17B:
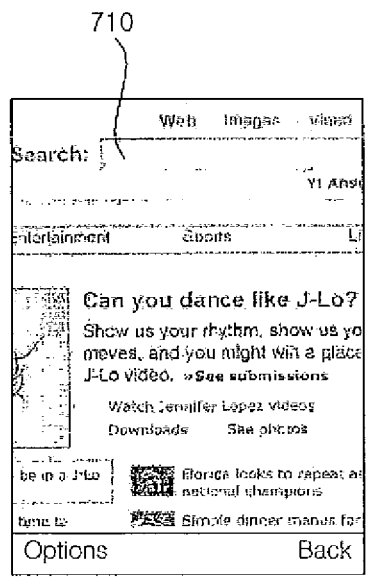
Figure 17C:
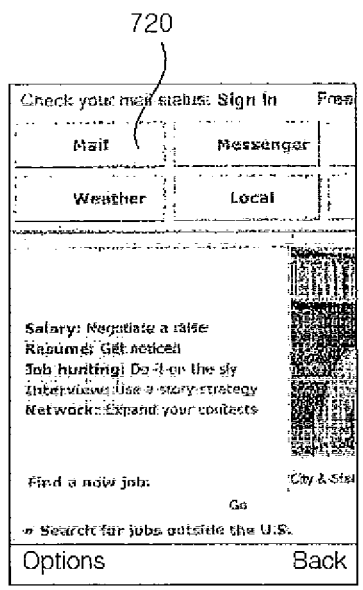
Figure 17D:
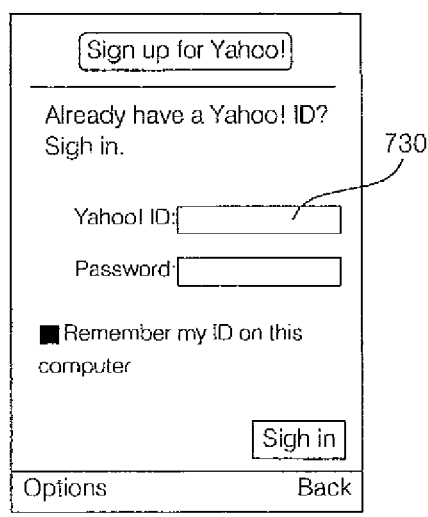

FIG. 17B shows a screen image displaying a search region 710 including a search window of the accessed Web page, FIG. 17C shows a screen image displaying link regions including hyperlinks in the accessed Web page, and FIG. 17D shows a screen image displaying a log-in region 730 including a log-in window in the accessed Web page.

As described above, in the process of accessing the Web page, at least one of the screen images as shown in FIGS. 17B to 17D may be set as a select region. The region selection may be performed in various manners, for example, by using a selector cursor or the like or by using a navigation key, a number key, or the like. The select region may be stored together with the corresponding Web page and a programming source in the memory 160.

With a region set, in the process of re-accessing the Web page, one of the screen images as shown in FIGS. 17B to 17D may be displayed as an initial screen image. If a plurality of regions have been set, one of the screen images as shown in FIGS. 17B to 17D may be selected to be displayed as an initial screen image, or the first set or the finally set region may be displayed as an initial screen image. In this manner, the screen images as shown in FIGS. 17B to 17D can be used as initial screen images, thereby allowing effective searching.

Figure 18A:
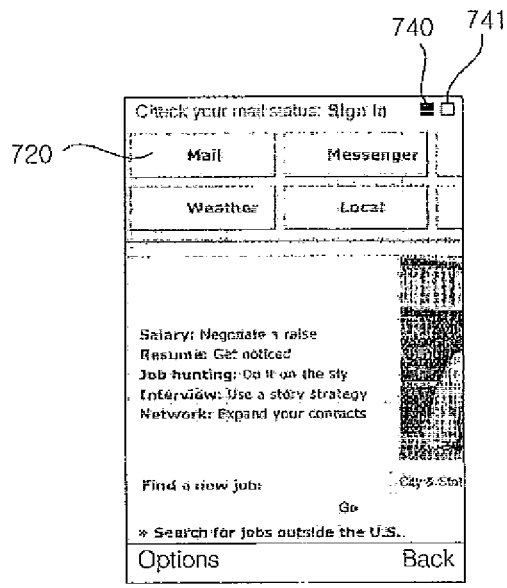
FIGS. 18A and 18B show screen images of a mini map together with a set region of accessed Web pages in the mobile terminal control method according to the second exemplary embodiment of the present invention.
Figure 18B:
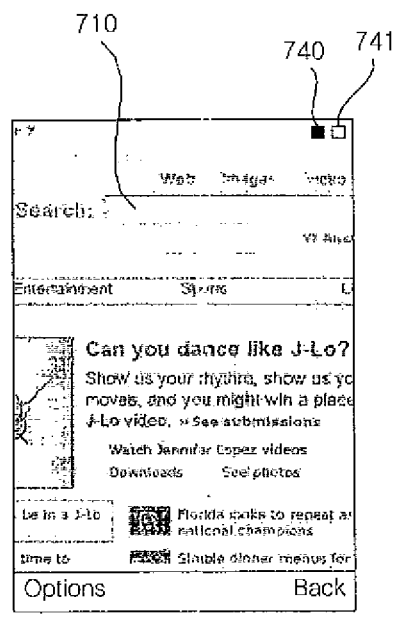

FIGS. 18A and 18B show screen images of a mini map together with a set region of accessed Web pages in the mobile terminal control method according to the second exemplary embodiment of the present invention.

FIG. 18A shows a screen image of a Web page based on a link region 720, and FIG. 18B shows a screen image of a Web page based on a search region 710. In addition, mini maps 740 and 741 indicating position information of the set regions are displayed on a portion of the screen 700, namely, at a right upper end portion of the screen. The mini maps 740 and 741 may serve as a hot button (i.e., abbreviated button or a speed button) used to immediately shift to the set region. For example, if the first mini map 740 is selected by using the select cursor or the like, the link region 720 in FIG. 18A corresponding to the first mini map 740 may be immediately displayed on the screen. In addition, if the second mini map 741 is selected by using the select cursor or the like, the search region 710 in FIG. 18B corresponding to the second mini map 741 may be immediately displayed on the screen.

The mini maps 740 and 741 are displayed in the square box-like shape in FIGS. 18A and 18B, but they may be displayed in various other forms or shapes such as a number, an icon, etc., without being limited thereto. Meanwhile, if a plurality of regions are set in the Web page or if a plurality of mini maps correspond thereto as shown in FIGS. 18A and 18B, the thickness of an edging portion, color or shade, the number, an icon, or the like, of the mini maps may be differentiated to discriminate the mini maps.

Figure 19:
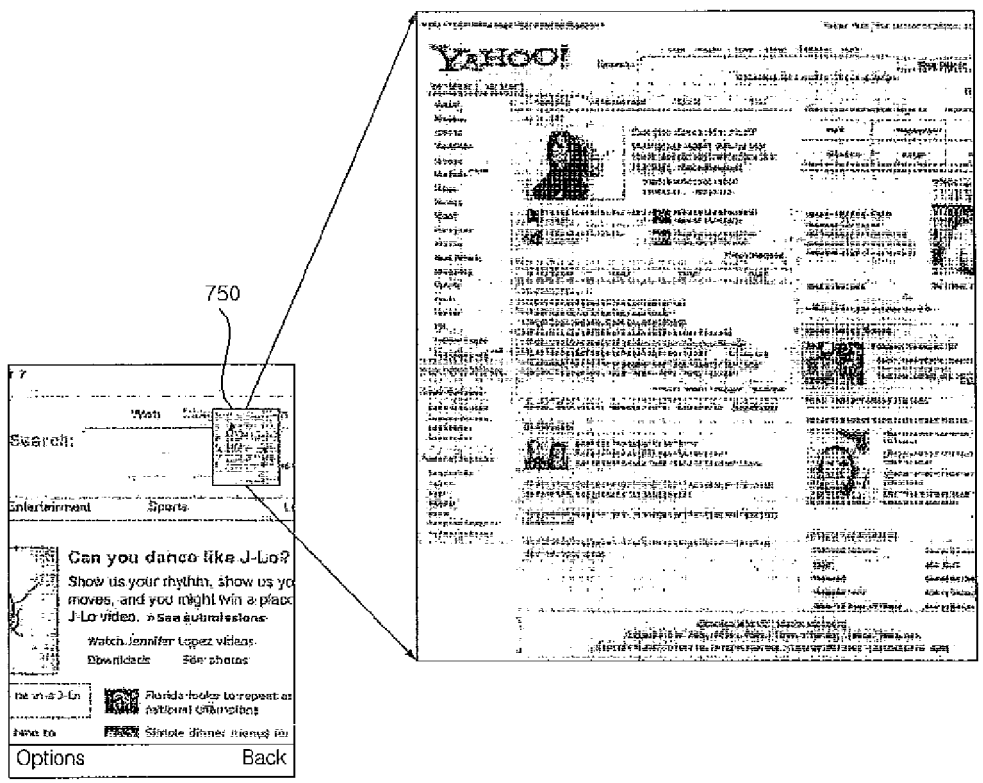
FIG. 19 shows screen images of a mini homepage obtained by reducing (scaling down) a Web page in the mobile terminal control method according to the second exemplary embodiment of the present invention.

FIG. 19 shows screen images of a mini homepage obtained by reducing a Web page.

With reference to FIG. 19, the entirety of the accessed Web page can be reduced into a mini Web page 750 so as to be displayed on a portion of the screen.

Figure 20A:
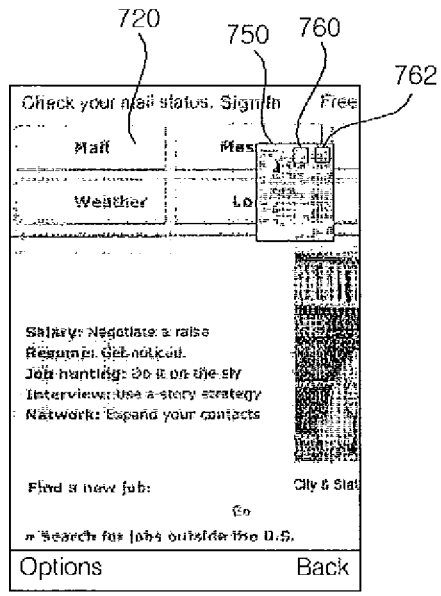
FIGS. 20A and 20B show screen images of a mini Web page together with a set region of accessed Web pages in the mobile terminal control method according to the second exemplary embodiment of the present invention.
Figure 20B:
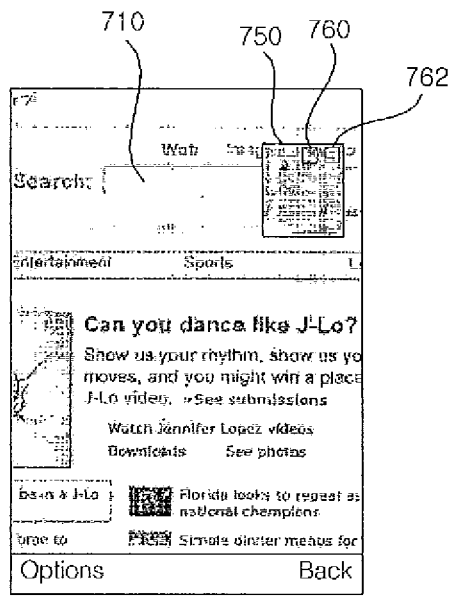

FIGS. 20A and 20B show screen images of a mini Web page together with a set region of accessed Web pages.

With reference to FIGS. 20A and 20B, a reduced region corresponding to a set region may be displayed in a mini Web page 750, and if a plurality of regions are set, corresponding reduced regions may be discriminately displayed in the mini Web page.

The reduced set region in the mini Web page may serve as a hot button used to immediately shift to the set region corresponding to the reduced set region. For example, if a first reduced set region 760 is selected by using the select cursor or the like, the link region 720 in FIG. 20A corresponding to the first reduced set region 760 may be immediately displayed on the screen. In addition, if the second reduced set region 762 is selected by using the select cursor or the like, the search region 710 in FIG. 20B corresponding to the second reduced set region 762 may be immediately displayed on the screen.

The reduced regions 760 and 762 in the mini Web page are displayed in the square box-like shape in FIGS. 20A and 20B, but they may be displayed in various other forms or shapes such as a number, an icon, etc. without being limited thereto, Meanwhile, if a plurality of regions are set in the Web page or if a plurality of reduced set regions in the mini Web page correspond thereto as shown in FIGS. 20A and 20B, the thickness of an edging portion, color or shade of the reduced set regions, a number, an icon, or the like, of the reduced set regions may be differentiated to discriminate the reduced set regions.

Figure 21:
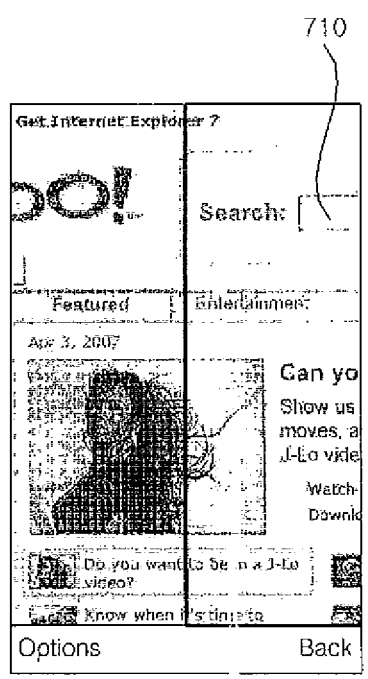
FIG. 21 shows a screen image with a frame demarcating a set region in the mobile terminal control method according to the second exemplary embodiment of the present invention.

FIG. 21 shows a screen image with a frame demarcating a set region.

When the search region 710 is set as a set region, the search region 710 may be demarcated by a frame (the edging portion) in order to discriminate it from other regions. Meanwhile, if there are a plurality of set regions, the thickness of the edging portion (framed portion), color, shade, number, icon of the of the set regions may be differently displayed so as to be discriminated from each other.

Figure 22:
FIG. 22 shows an initial screen image of a particular Web site accessed via a Web browser in the mobile terminal control method according to the third exemplary embodiment of the present invention.

FIG. 22 shows an initial screen image of a particular Web site accessed via a Web browser in the mobile terminal control method according to the third exemplary embodiment of the present invention.

When the user accesses a particular website (CNN website) by using the user input unit 130, the controller 180 outputs data received from a Web server via the wireless communication unit 110 to the output unit 150, so that the Web screen image of CNN is displayed on the display unit 151.

The user may search his desired information through Web surfing on the CNN Web screen image, and in this case, the user may designate a bookmark with respect to a particular point or a link of the screen image while performing Web browsing by using the user input unit 130. The bookmark, which refers to a function similar to 'favorite' in a PC, can be set for a particular point (content) as well as for a particular URL. FIG. 22 shows an example in which three points 13 are designated as bookmark points in the CNN Web screen image.

The designated bookmark points may be stored in the memory 160 under the control of the controller 180, and its storage format is as follows:
URL address (e.g., www.cnn.com)
bookmark point 1_position
bookmark point 2_position
bookmark point 3_position Thereafter, when the user accesses the CNN website again, as shown in FIG. 23, the controller 180 controls the display unit 151 of the output unit 150 to display the initial screen image of the CNN website and also display bookmark information designated by the user in a thumbnail screen image 810 corresponding to a mini Web page screen image. The thumbnail screen image 810 shows the summary of content of the Web screen, and displaying of the bookmark information on the thumbnail screen image 810 in re-accessing the Web page can be set (Yes/No) in a browser setting menu.

The bookmark information includes the position of a bookmark point, and the position of the bookmark point is displayed in a diagram (figure) of a certain shape, for example, in a square shape. The displayed diagram has a certain color, and the color of the diagram can be changed in the search menu. In this case, the user may shift to a bookmark 2 by using a direction key or a navigation key of the user input unit 130.

FIGS. 24A to 24C show screen images for explaining a procedure of displaying bookmark points on a thumbnail screen image in the mobile terminal control method according to the third exemplary embodiment of the present invention.

As shown in FIGS. 24A and 24B, the user may shift to a page having desired information from an initial screen image of a particular website. In this state, the user may set a bookmark point in the corresponding page and return to the initial screen image. In this case, as shown in FIG. 24C, the designated bookmark point may be displayed, for example, in a green square shape on the thumbnail screen image.

Because a particular color tone may be emphasized for each page, so the color of the bookmark point display diagram may be changed.

FIGS. 25A to 25C show screen images for explaining a procedure of setting the color of a bookmark point display diagram in the mobile terminal control method according to the third exemplary embodiment of the present invention.

FIG. 25A shows a screen image before the color of the square shape indicating the bookmark point is changed. In some cases, the square shape in the thumbnail screen image may not be well shown according to a background color of a displayed screen image, so the color of the bookmark point display diagram may be changed in an option menu as shown in FIG. 25B. The user may change the color of the bookmark point display diagram into a desired color in the 'color change' menu of the option menu, and the changing procedure is as shown in FIG. 25C.

In the present exemplary embodiment, the bookmark information includes the number of set bookmarks. The number of set bookmarks may be displayed in a pop-up manner on the display unit 151, and whether to display the number of the set bookmarks may be set in the browser setting menu.

FIGS. 26A to 26C show screen images for explaining a procedure for setting whether to display the number of bookmarks.

As shown in FIG. 26A, the user may set two bookmark points while reading the Web page, and the set bookmark points may be displayed in a green square shape on the thumbnail screen. In this state, as shown in FIG. 25B, the user may set whether (or not) to display the bookmark information by using the browser setting menu. Preferably, whether to display the bookmark information may include whether to display positions of the bookmark points and the number of bookmarks.

If the display of the number of bookmarks is set as 'ON' (activated) in the browser setting menu, the controller 180 reads the number of bookmarks stored in the memory 160 and display the same as a pop-up image a shown in FIG. 26C when returning to the screen image as shown in FIG. 26A, and if the display of the number of bookmarks is set as 'OFF', the controller does not display the number of bookmarks set by the user when the corresponding Web page is accessed again later.

In addition, the number of bookmarks may be outputted via the output unit 150, as well as displayed in the pop-up manner. In this case, the controller 180 may output the number of bookmarks in the form of sound via the audio output module 152.

In this manner, in the present exemplary embodiment of the present invention, the bookmark points previously designated by the user are displayed on the thumbnail screen image in colors that can be easily recognized with respect to the currently read Web page, and the number of previously designated bookmarks can be displayed as a pop-up image as necessary.

The mobile terminal and its control method according to the present invention may not be limited to configurations and methods of the above-described embodiments but may be modified in various manners, for which the entirety or some of the embodiments may be selectively combined.

In the embodiments of the present invention, the above-described method can be implemented as codes that can be read by a processor in a processor-readable recording medium provided in the mobile terminal such as an MSM (Mobile Station Modem). The processor-readable recording medium includes various types of recording devices in which data that can be read by the processor is stored. The processor-readable recording medium may include a ROM, a RAM, a CD-ROM, a magnetic tape, a floppy disk, an optical data storage device, and the like. The processor-readable medium also includes implementations in the form of carrier waves such as transmission via the Internet. In addition, the processor-readable recording medium may be distributed to computer systems connected by a network, in which the processor-readable codes may be stored and executed in a distributed manner.

As described above, according to the present invention, when a Web page is accessed, a region of the Web page desired by the user is set as a bookmarked region, and then, when the Web page is re-accessed through a bookmark, the bookmarked region can be displayed as an initial access screen. In addition, when the Web page is accessed, a certain region may be set to be displayed on the screen when the Web page is re-accessed. Accordingly, when the user accesses a Web page via the mobile terminal, his desired region can be quickly displayed to thus provide user convenience in performing Web surfing.

In addition, a thumbnail screen image function of a currently read Internet page can be utilized on the Web browser. That is, the user can display a previously designated bookmark point in a discernible color on a thumbnail screen image, and the number of designated bookmark points may be displayed. Thus, the user can easily recognize how many and where bookmark points are set on the currently read Web page through the thumbnail screen image, whereby the user can easily search a desired Web page within a shorter time.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of controlling a mobile terminal, the method comprising:
    accessing a Web page from the mobile terminal;
    displaying an image of the Web page on a screen of the mobile terminal;
    displaying a plurality of frames respectively corresponding to a plurality of regions of the image of the Web page, each frame not overlapping with another frame;
    selecting a frame corresponding to a region of the image of the Web page, the region being less than the entire image;
    setting the region as a bookmarked region by dragging the selected frame to a bookmark creation icon;
    displaying a bookmark list according to a command of an user, the bookmark list including first items in which the bookmarked region has been set and second items in which the bookmarked region has not been set, wherein each of the first items includes a name for a corresponding item and a first identifier to indicate that the corresponding item is a region-type bookmark, and each of the second items includes a name for a corresponding item and a second identifier to indicate that the corresponding bookmark item is not a region-type bookmark, the second identifier being different from the first identifier;
    displaying the bookmarked region as an initial access screen image in response to a user touch to the first identifier of the bookmark list; and
    displaying a region set as default as an initial access screen image in response to a user touch to a name of one of the first items of the bookmark list.

2. The method of claim 1, wherein the screen includes a touch screen, and the step of setting comprises:
    selecting the region in response to a user touch to the touch screen.

3. The method of claim 1, wherein the bookmark creation icon is located in an address display window that shows an address of the Webpage.

4. The method of claim 1, further comprising:
    displaying the region on the image so that the region is discernible from the image.

5. The method of claim 1, further comprising:
    displaying the region on the image so that the region is discernible from the image; and
    adjusting the size of the region.

6. The method of claim 1, further comprising:
    adjusting a display magnification of an image included in the region.

7. The method of claim 1, further comprising:
    displaying a mini map indicating a position of the region within the image.

8. The method of claim 7, further comprising:
    moving region within the image via user manipulation of the mini map.

9. The method of claim 1, the step of selecting a region comprising:
    displaying a boundary of a first selected region and changing to a second region as the selected region by shifting the boundary.

10. The method of claim 9, wherein the step of shifting the boundary comprises:
    dragging the boundary in response to a user touch and drag operation.

11. The method of claim 1, further comprising:
    accessing a website providing the Web page and logging in to the website by using stored log-in authentication information, before displaying the initial access screen image.

12. The method of claim 11, further comprising:
    receiving and storing the log-in authentication information.

13. The method of claim 11, wherein the log-in authentication information comprises a user ID and a password, and is stored after being ciphered.

14. A mobile terminal, comprising:
- a display; and
- a controller operatively connected to the display, the controller configured to
- access a Web page from the mobile terminal;
- display an image of the Web page on the display;
- display a plurality of frames respectively corresponding to a plurality of regions of the image of the Web page, each frame not overlapping with another frame;
- select a frame corresponding to a region of the image of the Web page, the region being less than the entire image;
- set the region as a bookmarked region by a drag of the selected frame to a bookmark creation icon located in an address display window that shows an address of the Webpage;
- display a bookmark list according to a command of an user, the bookmark list including first items in which the bookmarked region has been set and second items in which the bookmarked region has not been set, wherein each of the first items includes a name for a corresponding item and a first identifier to indicate that the corresponding item is a region-type bookmark, and each of the second items includes a name for a corresponding item and a second identifier to indicate that the corresponding bookmark item is not a region-type bookmark, the second identifier being different from the first identifier;
- display the bookmarked region as an initial access screen image in response to a user touch to the first identifier of the bookmark list; and
- display a region set as default as an initial access screen image in response to a user touch to a name of one of the first items of the bookmark list.

15. The mobile terminal of claim 14, wherein the display comprises a touch screen.

16. The mobile terminal of claim 15, wherein the controller is configured to select the region in response to a user touch to the touch screen.

17. The mobile terminal of claim 14, further comprising:
- a memory operatively connected to the controller and configured to store information about the bookmarked region.

\* \* \* \* \*